US005981946A

United States Patent [19]

Mason

[11] Patent Number: 5,981,946

[45] **Date of Patent: *Nov. 9, 1999**

[54] TIME-OF-FLIGHT MASS SPECTROMETER DATA ACQUISITION SYSTEM

[75] Inventor: Michael C. Mason, St. Joseph, Mich.

[73] Assignee: Leco Corporation, St. Joseph, Mich.

[ * ] Notice: This patent is subject to a terminal disclaimer.

[21] Appl. No.: 08/996,413

[22] Filed: Dec. 22, 1997

Related U.S. Application Data

[63] Continuation-in-part of application No. 08/558,783, Nov. 16, 1995, Pat. No. 5,712,480.

[51] Int. Cl.[6] .............................. B01D 59/44; H01J 49/00

[52] U.S. Cl. ............................ 250/287; 250/281; 250/282

[58] Field of Search .................................... 250/281, 282, 250/287

[56] References Cited

U.S. PATENT DOCUMENTS

| | | | |
|---|---|---|---|
| 3,634,683 | 1/1972 | Bakker . | |
| 3,832,642 | 8/1974 | Helgeland | 330/2 |
| 3,870,881 | 3/1975 | Halliday et al. . | |
| 3,916,187 | 10/1975 | Fletcher et al. . | |
| 3,920,987 | 11/1975 | Anbar et al. . | |
| 4,209,784 | 6/1980 | Sumner et al. | 345/168 |
| 4,458,149 | 7/1984 | Muga . | |
| 4,472,631 | 9/1984 | Enke et al. . | |
| 4,490,806 | 12/1984 | Enke et al. . | |
| 4,686,365 | 8/1987 | Meek et al. | 250/281 |
| 4,970,390 | 11/1990 | Szymczak . | |
| 5,032,722 | 7/1991 | Boesl et al. . | |
| 5,073,713 | 12/1991 | Smith et al. . | |
| 5,078,135 | 1/1992 | Caprioli | 128/632 |
| 5,144,127 | 9/1992 | Williams et al. . | |
| 5,175,430 | 12/1992 | Enke et al. . | |
| 5,194,731 | 3/1993 | Turner . | |
| 5,196,708 | 3/1993 | Mullock . | |
| 5,367,162 | 11/1994 | Holland et al. . | |
| 5,396,065 | 3/1995 | Myerholtz et al. . | |
| 5,463,219 | 10/1995 | Buckley et al. . | |
| 5,712,480 | 1/1998 | Mason | 250/287 |

FOREIGN PATENT DOCUMENTS

| | | |
|---|---|---|
| 2274197 | 7/1994 | United Kingdom . |
| 8900228 | 2/1987 | WIPO . |

OTHER PUBLICATIONS

Boyle et al., Analytical Chemistry, vol. 64, p. 2084 (1992).

Myers and Hieftje, Microchemical Journal (1993).

Cameron, A.E.; Eggers, D.F.: Rev. Sci. Instrum., vol. 19, p. 605 (1948).

Futrell et al., Modification of Time–of–Flight Mass Spectrometer for Investigation of Ion–Molecule Reactions at Elevated Pressures, Rev. Sci. Instrum., vol. 39, No. 3, p. 340 (1968).

Miller et al., Improvement of Spectral Baseline Stability for a Time–of–Flight Mass Spectrometer Operated at Elevated Pressures, Rev. Sci. Instrum., vol. 40, p. 503 (1969).

(List continued on next page.)

*Primary Examiner*—Bruce C. Anderson
*Attorney, Agent, or Firm*—Price, Heneveld, Cooper, DeWitt & Litton

[57] ABSTRACT

A system intended for use in time-of-flight mass spectroscopy for detecting at least one ion species in an ion spectra including a signal acquisition circuit for detecting the ions in the spectra and generating output signals indicative thereof, a sequence and storage control circuit for tagging certain ones of the signals to be stored, a memory circuit for storing the output signals tagged by the sequence and storage control circuit, and a digital signal processor circuit receiving the tagged signals from the memory for summing the tagged data and generating an output signal indicative of a value of the ion species detected. A method for collecting the data is also disclosed. Further, the system of the present invention allows for easy storage of signals to be stored in a mass mapped buffer and addressed via a look-up table without requiring additional software to tag the data. Also, the system and method further provide for two banks of gain memory to update the amplifier gain setting without loss or corruption of data collection.

22 Claims, 25 Drawing Sheets

OTHER PUBLICATIONS

Studier, Martin, Continuous Ion Source for a Time–of–Flight Mass Spectrometer Rev. Sci. Instrum., vol. 34, No. 12 p. 1367 (1963).

Di Valentin and Dove, Satellite Mass Peaks in Time–of–Flight Mass Spectrometry of Ions Continuously Sampled From an External Source, International Journal of Mass Spectrometry and Ion Physics, p. 359 (1973).

Fowler and Good, A Theory on Obtaining Short Bursts of Ions from a Beam of Ions, Nuclear Instruments and Methods, vol. 7, p. 245 (1960).

Sanzone, George, Energy Resolution of the Conventional Time–of–Flight Mass Spectrometer Rev. Sci. Instrum., vol. 41, No. 3, p. 741 (1970).

Pinkston et al., New Time–of–Flight Mass Spectrometer for Improved Mass Resolution, Versatility, and Mass Spectrometry/Mass Spectrometry Studies, Rev. Sci. Instrum., vol. 57 (4), p. 583 (1986).

Dodonov et al., Electrospray Ionization on a Reflecting Time–of–Flight Mass Spectrometer, RJ Cotter, ACS Book (1993).

Gohl et al., Time–of–Flight Mass Spectrometry for Ions of Large Energy Spread, International Journal of Mass Spectrometry and Ion Physics, vol. 48, p. 411 (1983).

Boesl, et al., A High–Resolution Time–of–Flight Mass Spectrometer with Laser Desorption and a Laser Ionization Source, Analytical Instrumentation, vol. 16(1), p. 151 (1987).

Bakker, J. M. B., A Beam–Modulated Time–of–Flight Mass Spectrometer Part I: Theoretical Considerations, Scientific Instruments, vol. 6, No. 8, p. 677 (1973).

Mamyrin and Shmikk, The Linear Mass Reflectron, Soviet Physics, J.E.P.T., vol. 49(5) (1979).

Bakker, J.M.B., A Beam–Modulated Time–of–Flight Mass Spectrometer; Part II: Expiremental Work, Scientific Instruments, vol. 7, No. 5, p. 364 (1974).

Yefchak et al., Beam Deflection for Temporal Encoding in Time–of–Flight Mass Spectrometry, Journal of American Society for Mass Spectrometry, vol. 1, No. 6 (1990).

Ma, C. et al., The Design of an Atmospheric Pressure Ionization/Time–of–Flight Mass Spectrometer Using a Beam Deflection Method, Rev. Sci. Instrum., vol. 63, p. 139 (1992).

Van Breemen et al., Time–Resolved Laser Desorption Mass Spectrometry, Journal of Mass Spectrometry and Ion Physics, vol. 49, No. 1 (1983).

Olthoff et al., Liquid Secondary Ion Time–of–Flight Mass Spectrometry, Analytical Chemistry, (1987).

Bergmann et al., High–Resolution Time–of–Flight Mass Spectrometer, Rev. Sci Instrum., vol. 60, No. 4 (1989).

Grix, et al., A Time–of–Flight Mass Analyzer with High Resolving Power, Physikalisches Institut Der Justus–Liebig–Universitat, West Germany (1988).

Karataev et al., New Method for Focusing Ion Bunches in Time–of–Flight Mass Spectrometers, Soviet Physics—Technical Physics, vol. 16, No. 7 (1972).

Bakker, J.M.B., The Time–Focusing Principle: A Double–Focusing Design for Time–of–Flight Mass Spectrometers, Journal of Mass Spectrometry and Ion Physics, vol. 6, No. 314 (1971).

Poschenrieder, W.P., Multiple–Focusing Time–of–Flight Mass Spectrometers Part II: TOFMS with Equal Energy Acceleration, Journal of Mass Spectrometry and Ion Physics, vol. 9, No. 4 (1972).

Kinsel and Johnston, Post Source Pulse Focusing: A Simple Method to Achieve Improved Resolution in a Time–of–Flight Mass Spectrometer, Int'l Journal of Mass Spectrometry and Ion Processes, vol. 91 (1989).

Dawson and Guilhaus, Orthogonal–Acceleration Time–of–Flight Mass Spectrometer, Rapid Communications in Mass Spectrometry, vol. 3, No. 5 (1989).

Li, G., Myers D.P., and Hieftje, G.M., Ion Optical Considerations and Design of a Time–of–Flight Mass Spectrometer for Sampling Ions from an Atmospheric Pressure Ionization Source.

Dodonov et al, Electrospray Ionization on a Reflecting Time–of–Flight Mass Spectrometer, ACS Book (1993).

Houk, R.S., Anal. Chem., vol. 58, No. 1, p. 97A (1986).

Houk, Robert S. et al., Inductively Coupled Argon Plasma as an Ion Source for Mass Spectrometric Determination of Trace Elements, Analytical Chemistry, vol. 52, No. 14 (Dec. 1980).

de Heer, Walt A. et al., Large ion volume time–of–flight mass spectrometer with position– and velocity– sensitive detection capabilities for cluster beams, Rev. Sci. Instrum., vol. 62(3) (Mar 1991).

Wiley, W.C. et al., Time–of–Flight Mass Spectrometer with Improved Resolution, Rev. of Sci. Instrum., vol. 26, No. 12 (Dec. 1955).

Holland, J.F., et al; Design, Construction, and Evaluation of an integrating transient recorder for data acquisition, Rev. Sci. Instrum. 62 (1) Jan. 1991.

Steffens, P., et al; A Time–of–Flight Mass Spectrometer for Static SIMS Applications, Journal of Vacuum Science & Technolgoy A, Second Series, vol. 3, No. 3, Part II, May/Jun. 1985.

Kristo, M.J., et al; System for Simultaneous Count/Current Measurement with Dual–Mode Photon Particle Detector, Rev. Sci. Instrum. 59 (3), Mar. 1988.

Search Notes on Patnet No., 4,209784, Dec. 2, 1998. Two pages.

Kawatoh, E., et al; Analysis of Sputtered Neutrals by Non-resonant Multiphoton Ionization Japanese Journal of Applied Physics, Mar. 1991, vol. 30, No. 3.

Hudor, A.M.; Fast Electronics for Time–of–Flight Measurements, Rev. Sci. Instrum. 52(6), Jun. 1981.

Green, L.W., Macdonald, R.G., and Sopchyshyn, F.C.; Fast–Pulse Detection for Isotopic Abundance Determination by Resonance Ionization, Time–of–Flight Mass Spectrometry, Analytical Instrumentation, 17(1&2), 195–214 (1988).

Kutscher et al., A Transversally & Longitudinally Focusing Time–of–Flight Mass Spectrometer, Journal of Mass Spectrometry Ion Physics, vol. 103, p. 117 (1991).

Wiley and McLaren, Time–of–Flight Mass Spectrometer with Improved Resolutions, Rev. Sci. Instrum., vol. 26, p. 1150 (1955).

Mamyrin et al., The mass–reflectron, a new nonmagnetic time–of–flight mass spectrometer with high resolution, Soviet Physics, J.E.P.T., vol. 37, p. 45 (1973).

Benninghoven et al., Organic Mass Spectrometry, vol. 12, p. 593 (1977).

Karas et al., International Journal of Mass Spectrometry Ion Proceedings, vol. 92, p. 231 (1989).

O'Harleron et al., Techinical Document Report No. ASD TDR 62–644, Parts I and II (1964).

Sin et al., Analytical Chemistry, vol. 63, p. 2897 (1991).

Dodonov et al., Book of Abstracts from the Twelfth International Mass Spectrometry Conference, Amsterdam (1991).

Coles et al., Proceedings of the Fortieth ASMS Conference on Mass Spectrometry and Applied Topics vol. 10 (1992).

TIME-OF-FLIGHT MASS SPECTROMETER DATA ACQUISITION SYSTEM

CROSS-REFERENCE TO RELATED APPLICATION

This application is a continuation-in-part of U.S. patent application Ser. No. 08/558,783, filed Nov. 16, 1995 now U.S. Pat. No. 5,712,480.

BACKGROUND OF THE INVENTION

This invention relates generally to the detection of ions in mass spectrometry, and more particularly to a data acquisition system including methods of operation and apparatus for determining ion abundances at pre-selected time intervals of one or more ionic spectra.

The science of mass spectrometry has been proven to be a valuable tool in analytical chemistry. Mass spectrometry is premised on the fact that electrically neutral molecules of a sample can be charged or ionized and their motion controlled by electric and magnetic fields. The response of a charged molecule to magnetic and electric fields is influenced by the mass-to-charge ratio of the ion so that ions of a specific mass-to-charge ratio can be selectively detected.

Mass spectrometers differ from each other primarily in the way in which ions of different mass-to-charge ratios are distinguished from each other. Magnetic sector mass spectrometers separate ions of equal energy by the ions' momentum as they are reflected or dispersed in a magnetic field. Quadrapole mass spectrometers separate ions based upon their rate of acceleration in response to a high frequency radio frequency field in the presence of a direct current field. Ion cyclotrons and ion trap mass spectrometers discriminate ions on the frequency or dimensions of their resonant oscillations in alternating current fields. Time-of-flight mass spectrometers discriminate ions according to their velocity over a fixed distance.

Although relatively straightforward in design, time-of-flight (hereinafter "TOF") mass spectrometers produce data at a very high rate. Because ions having different mass-to-charge ratios may be present in a single sample, they will strike the detectors at different times according to their velocity or kinetic energy. The detector output signal comprises a sequence of ion arrival responses which are compressed within a very short time interval, generally less than one-tenth of a microsecond. Within a hundred microseconds, all of the ions, including the heaviest, have traveled the length of the TOF spectrometer and arrived at the detector to produce a spectrum of this sample molecule. Up to as many as one million spectra may be produced for a given sample analyzed. Additionally, these spectra may need to be separated into chronologically ordered sets. The time scale would be on the order of one millisecond.

Only a small segment containing certain ionic compounds of all of the data produced by the analysis of a given sample may be of interest. In the past, however, scientists had to collect data over the entire spectra produced by the sample. To reduce the amount of data produced, and to focus in on the ionic compound of interest, it has been proposed to turn the detection circuit on just prior to the predicted arrival time or window of a selected compound. Details of such a system are disclosed in U.S. Pat. No. 5,367,162, owned by the assignee of the invention. This patent also provides a thorough discussion of the prior art and its disclosure is incorporated herein by reference. However, none of the prior devices are capable of continuous and uninterrupted detection, collection, and processing of time-of-flight spectra. More specifically, none of the prior art devices detect and continuously convert the analog signals to digital signals for selection, summation, and processing using a compact system operating at a substantially reduced power level than heretofore achieved.

SUMMARY OF THE INVENTION

According to one aspect of the present invention, a data acquisition system is provided for detecting a plurality of ions in a time-of-flight mass spectrometer and providing an output indicative of only select ions of interest. More particularly, the data acquisition system includes a signal acquisition circuit for detecting ions and generating output signals indicative thereof. A storage control circuit marks the output signals to be stored and an accumulator circuit holds the marked signals. A mass mapped buffer stores the signals to be stored according to the mass-to-charge ratio, and a look-up table addresses the location of the signals stored in the mass mapped buffer. A controller controls the mass mapped buffer and the look-up table and arranges the signals to be stored in the mass mapped buffer. A digital signal processor circuit receives the signals stored in the buffer for processing, and generates an output indicative thereof.

According to another aspect of the present invention, a data acquisition system for detecting ions of interest in a mass spectrometer with enhanced amplifier gain adjustment is provided. A signal acquisition circuit detects ions and generates output signals indicative thereof, a storage control circuit marks the output signals to be stored, and an amplifier with an adjustable gain setting amplifies the signals to be stored. A first bank of gain memory stores a first set of gain settings, while a second bank of gain memory stores a second set of gain settings. A gain control circuit selects one of the gain settings from one of the first and second banks of gain memory, with the one of the first and second banks of gain memory being active to provide a current gain setting, while the other is idle to allow for updating of the selected gain setting. A digital signal processor circuit receives the signals to be stored for processing, and generates an output indicative thereof.

A method is also provided for detecting ions of interest in a time-of-flight mass spectrometer, comprising the steps of detecting ions with a signal acquisition circuit and generating output signals indicative thereof, marking the output signals to be stored, holding the signals to be stored in an accumulator circuit, addressing locations of the signals to be stored in the mass mapped buffer with a look-up table, storing in a mass mapped buffer the signals to be stored according to mass-to-charge ratio, and processing the stored signals in the buffer and generating an output indicative thereof. Also provided is a method for detecting ions of interest in a mass spectrometer comprising the steps of detecting ions and generating output signals indicative thereof, marking the output signals to be stored, amplifying the signals to be stored with an amplifier having an adjustable gain setting, storing a first set of gain settings in a first bank of gain memory and a second set of gain settings in a second bank of gain memory, selecting one of the gain settings from the one of the first and second banks of gain memory, with one of the first and second banks of gain memory being active to provide a current gain setting, while the other of said first and second banks of gain memory is idle to allow for updating of the adjustable gain setting, and processing the signals to be stored and generating an output indicative thereof.

The advantages provided by and resulting from the data acquisition system and method embodying the invention include the ability to collect and process data at more than twice the rate conventionally available. Additionally, resolution is significantly improved as a result of collecting larger segments of data over a shorter time interval than previously available. This results in sharper and better defined data sets than previously available, making it possible to discriminate between ion species mass-to-charge ratios previously undetectable. Also, the data acquisition system and method embodying the invention provide the further advantage of ensuring that all of the particular data of interest are collected since all data is digitized and temporarily stored. In this manner, data is not lost as a result of powering up a system or digitizing circuit just after the ions of interest have already been partially detected. The system of the present invention allows for enhanced organization and storage of signals in a mass mapped buffer without requiring the need for additional software to tag each group of data. Further, the system and method of the present invention further provide for easy updating of the amplifier gain setting without the loss or corruption of data collection.

These and other features, objects, and benefits of the invention will be recognized by those who practice the invention and by those skilled in the art, from reading the following specification and claims, together with reference to the accompanying drawings.

DETAILED DESCRIPTION OF THE PREFERRED EMBODIMENTS

Figure 1:
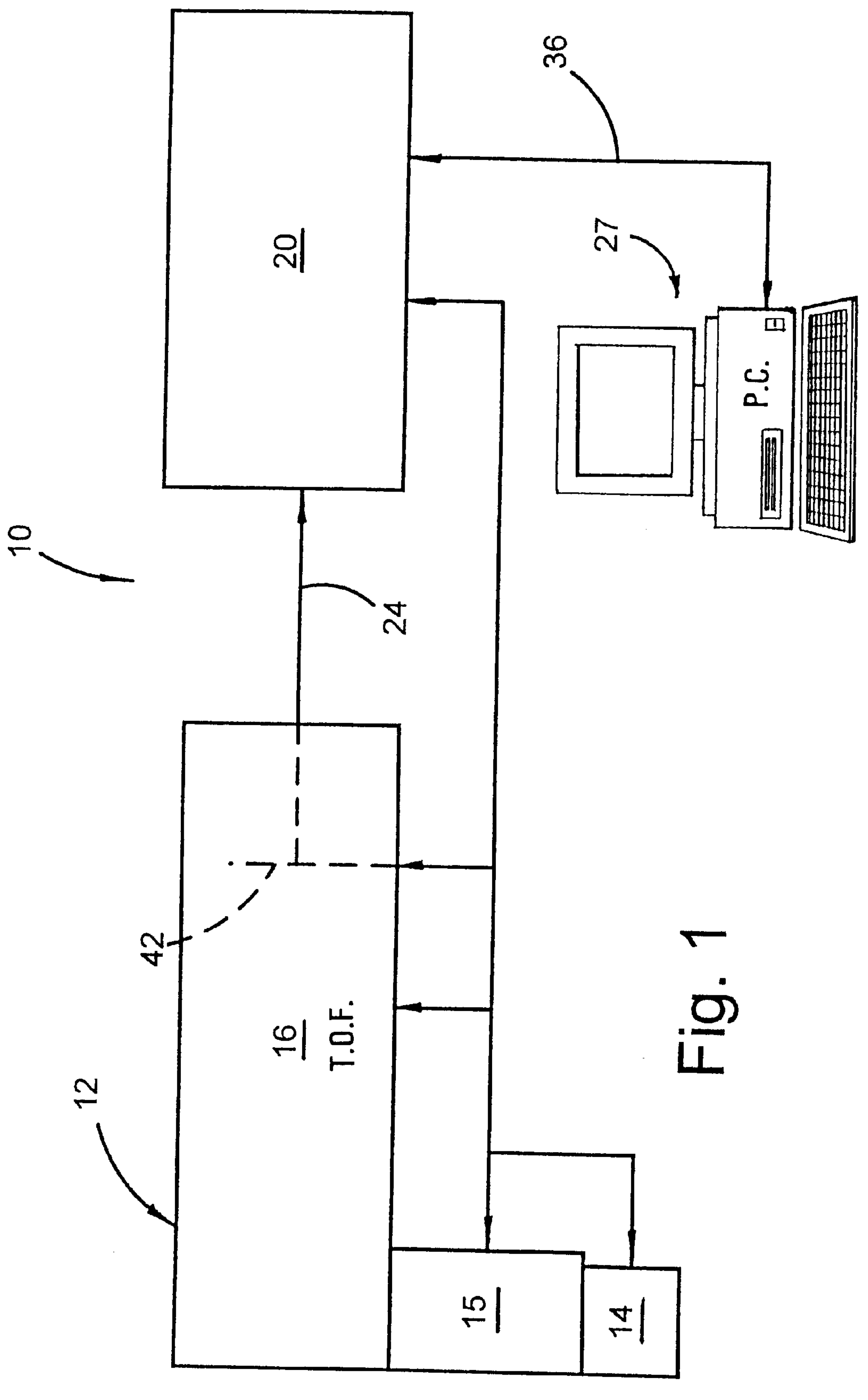
FIG. 1 illustrates, in block diagram form, a TOF mass spectrometer embodying the invention.

Throughout the following description, reference will be made to several different drawing figures wherein similar or like components are identified by the same label or reference numeral. The multiple reference or element identification is provided as a way of connecting one circuit on one page to a companion circuit or element on a different page. In particular, and in reference to the drawing figures, FIG. 1 generally shows in block diagram form a TOF mass spectrometer system 10 embodying the instant invention. The spectroscope 10 includes a time-of-flight mass spectrometer 12, including, but not limited to, an orthogonal or on-axis flight tube configuration using any one of a number of sources 14, such as a gas chromatograph, a glow discharge source, an inductively coupled plasma source, or the like. For the purposes of example only, source 14 is disposed at one end of a sample chamber 15, orthogonal to a flight tube 16. Disposed at one end of the flight tube 16 is a detector or transducer 42, described in greater detail below. Detector 42 provides an analog output over line 24 to a data acquisition system 20 to record and process data produced by sensor 42. Furthermore, data acquisition system 20 provides one or more outputs along one or more lines, generally indicated as 23, to control operation of the mass spectrometer 12. Data acquisition system 20 is operably connected to a personal computer or other interface 27 through data lines or buses 36. Across buses or lines 36, the user may control substantially all of the operating parameters of spectrometer 12 as well as the data collection and processing procedures followed by data acquisition system 20.

Figure 2:
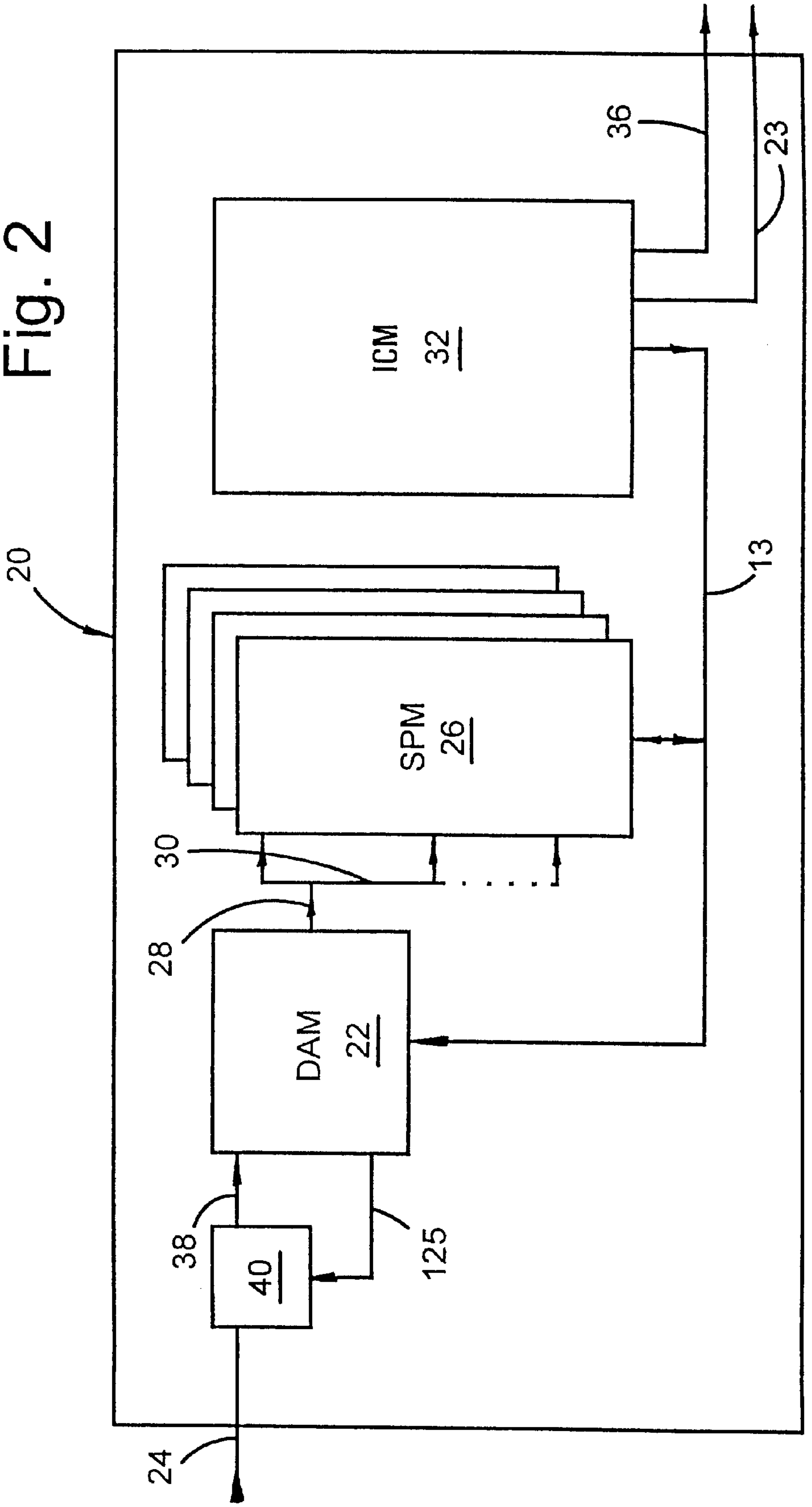
FIG. 2 generally illustrates, in block diagram form, the principal components of a data acquisition system embodying the instant invention.

Referring to FIG. 2, there is shown, for example, one embodiment of data acquisition system 20 for use with time array detection in TOF mass spectrometry. Generally, system 20 is comprised of four modules, including a pre-amplifier 40 connected to an ion detector 42 and a data acquisition module (DAM) 22 operatively connected to receive an analog input signal at 38 from pre-amplifier circuit 40, described below, a signal processor module (SPM) 26 operably coupled to receive a digital input signal from DAM 22 over buses 28 and 30, and an instrument control module (ICM) 32 configured to receive a digital output from SPM 26 over a bus 13. Instrument control module 32 is preferably interconnected with the other modules, such as 22 and 26, through line 13, specific modules of system 10 over lines 23, and a personal computer (PC) or other processor through data bus or line 36, as will be described in greater detail below.

Data acquisition system 20 is designed to provide control and sequencing of the operations of the TOF mass spectrometer, act as a centralized time base for spectrometer 12, collect and process data from ion detector 42, control the gain settings of the ion detector output pre-amplifier, and provide a set of time array data to PC or other processor 27.

The principal advantage offered by the system described herein is that the entire analog input signal 24 is converted to a digital signal in DAM 22, for each sample or transient analyzed, as a function of time. The digital data collected during a particular instant or time interval of interest is labeled or tagged in DAM 22 to be stored for later processing. The digital data signals which are tagged or identified as not to be stored (or not labeled or identified as the case may be) are discarded by writing over the discarded data with new data. The tagged data signals are transferred by buses 28 and 30 to SPM 26 wherein the data are summed and pre-processed. DAM 22 and SPM 26 contain a plurality of dedicated registers and buses such that the data signals are divided and processed at a reduced duty cycle. The summed data are transferred by bus 13 to ICM 32 for additional processing and transmission to PC 27. Each of the components comprising system 20 are described in detail below.

Figure 6A:
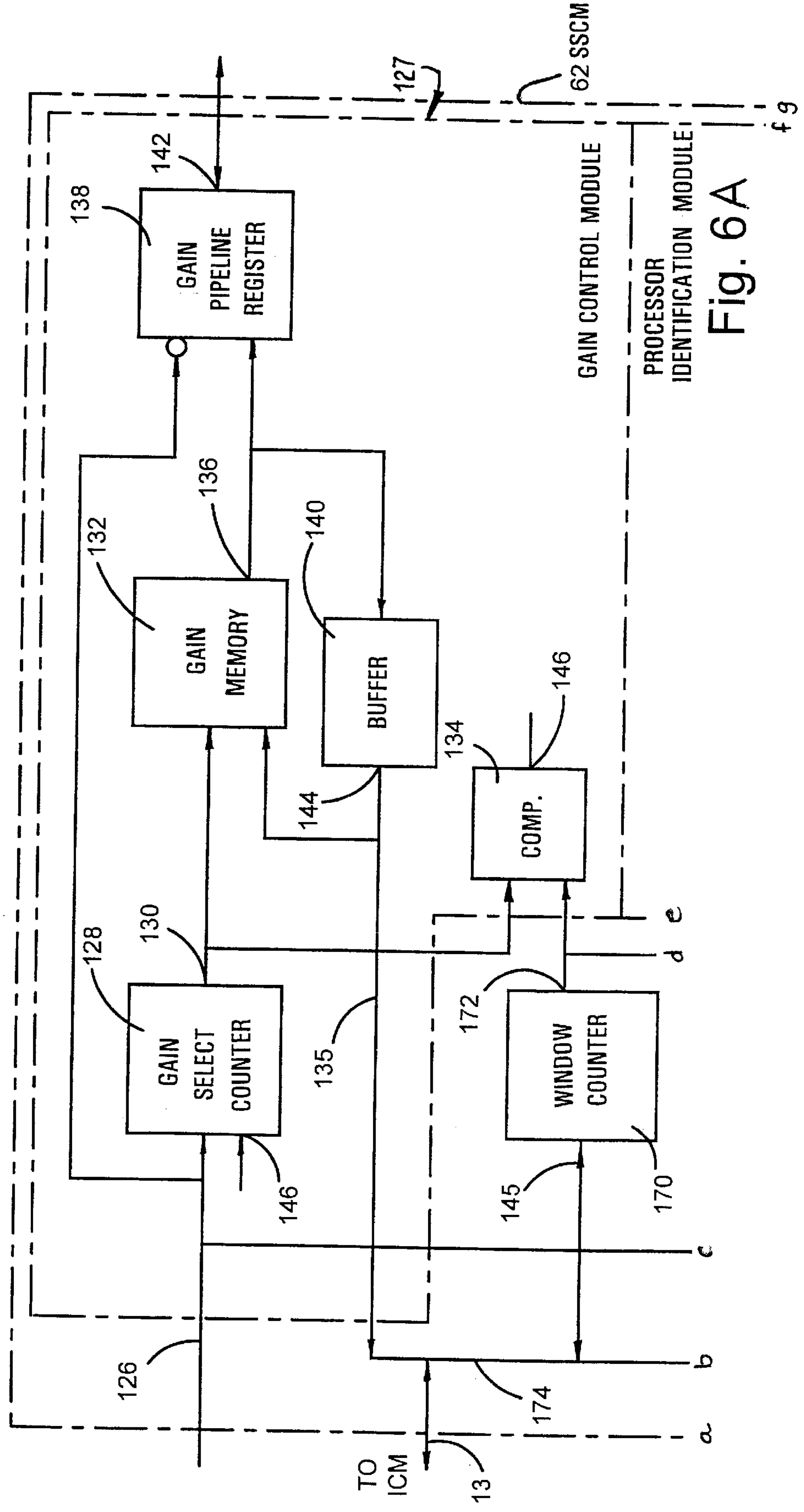
FIG. 6 is an electrical circuit in block diagram form generally illustrating a pre-amplifier gain control and processor identification circuit employed in the sequence and memory time base circuit.
Figure 6B:
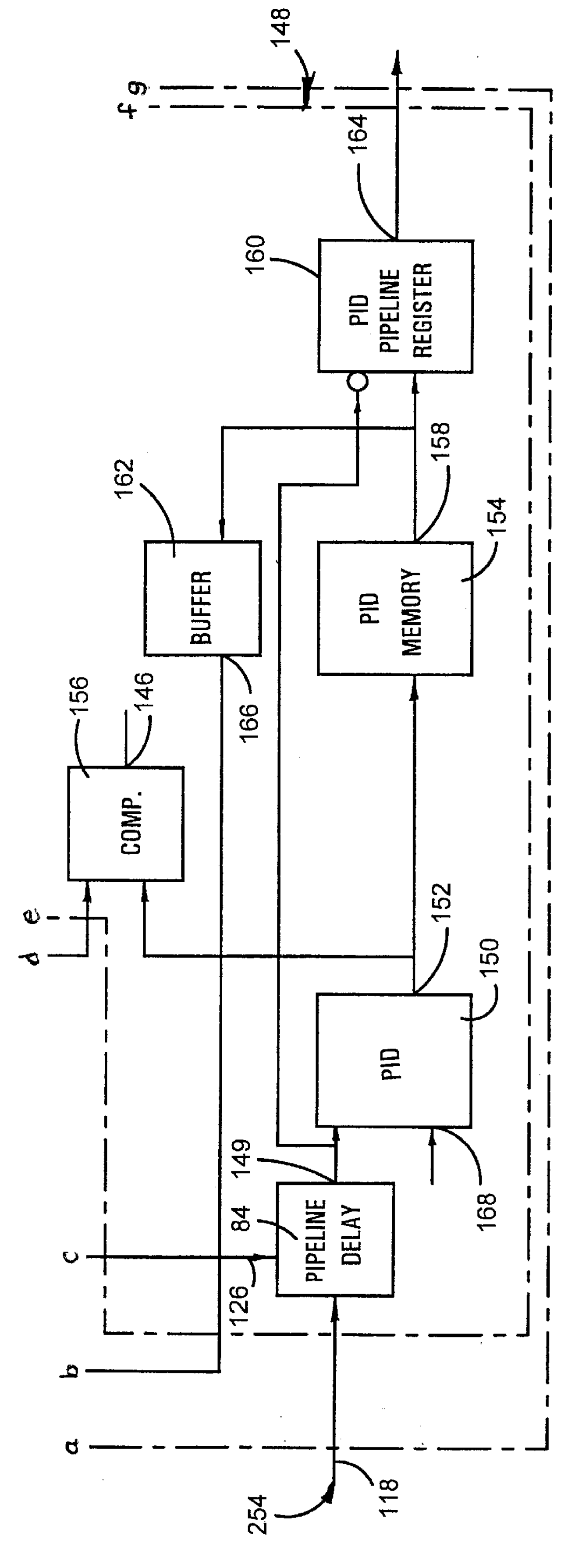
Figure 7:
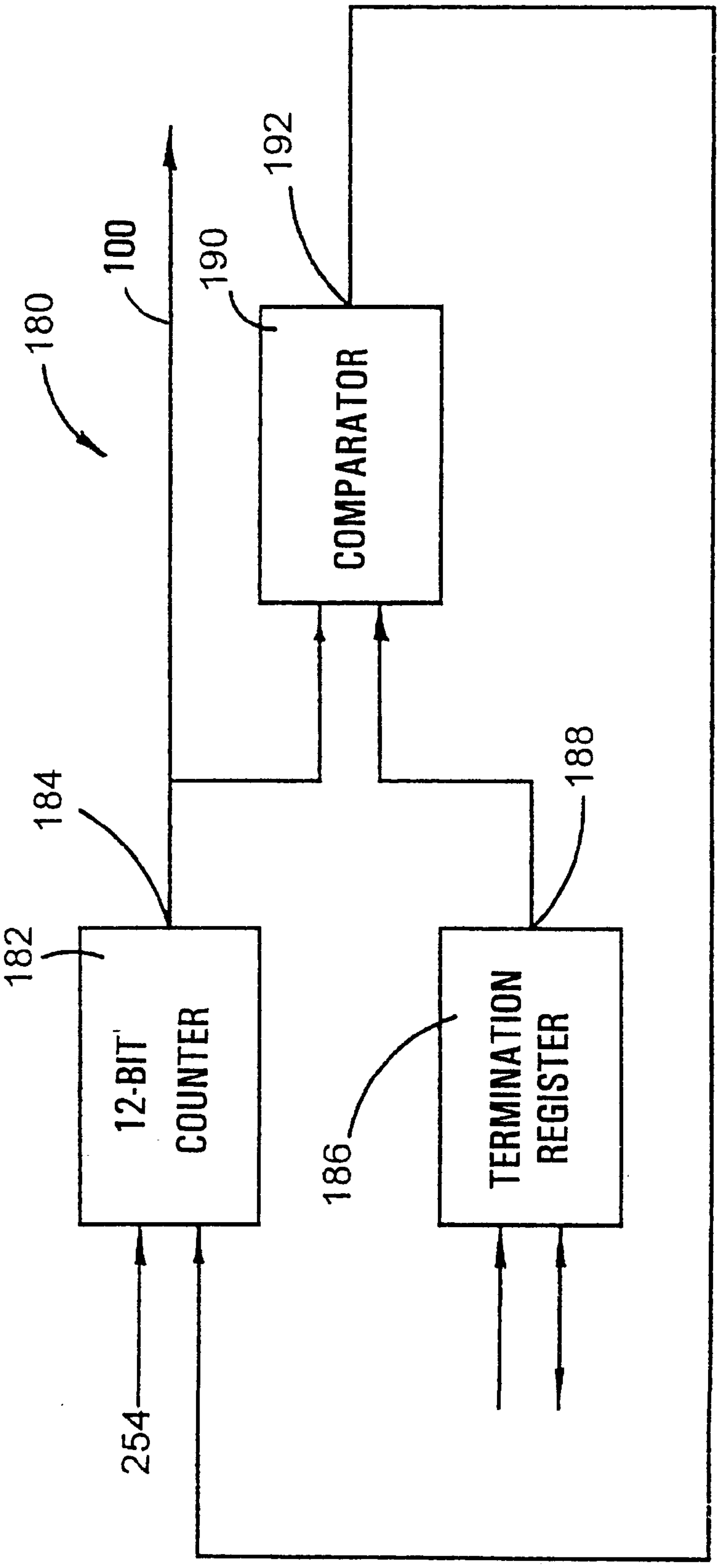
FIG. 7 is an electrical circuit in block diagram form generally illustrating a TOF mass spectrometer period counter employed in the sequence and memory time base circuit.

The ion detector circuit 42 (FIG. 1) detects ions within the TOF mass spectrometer 12 and provides analog signals to input 24. In particular, detector 42 is a conventional ion detector 42 having an output 24 connected to pre-amplifier 40. Ion detector 42 may be any one of a number of detectors currently available, including microchannel plate detectors and secondary electron multiplier detectors. The pre-amplifier 40 acts as either a variable attenuator or a variable gain stage having a gain control input for receiving signals from gain control circuit 127 (FIG. 6) to selectively control the amplitude of signals output therefrom as described below. The output of the amplifier 40 is connected to the input 38 on data acquisition module 22.

Figure 3A:
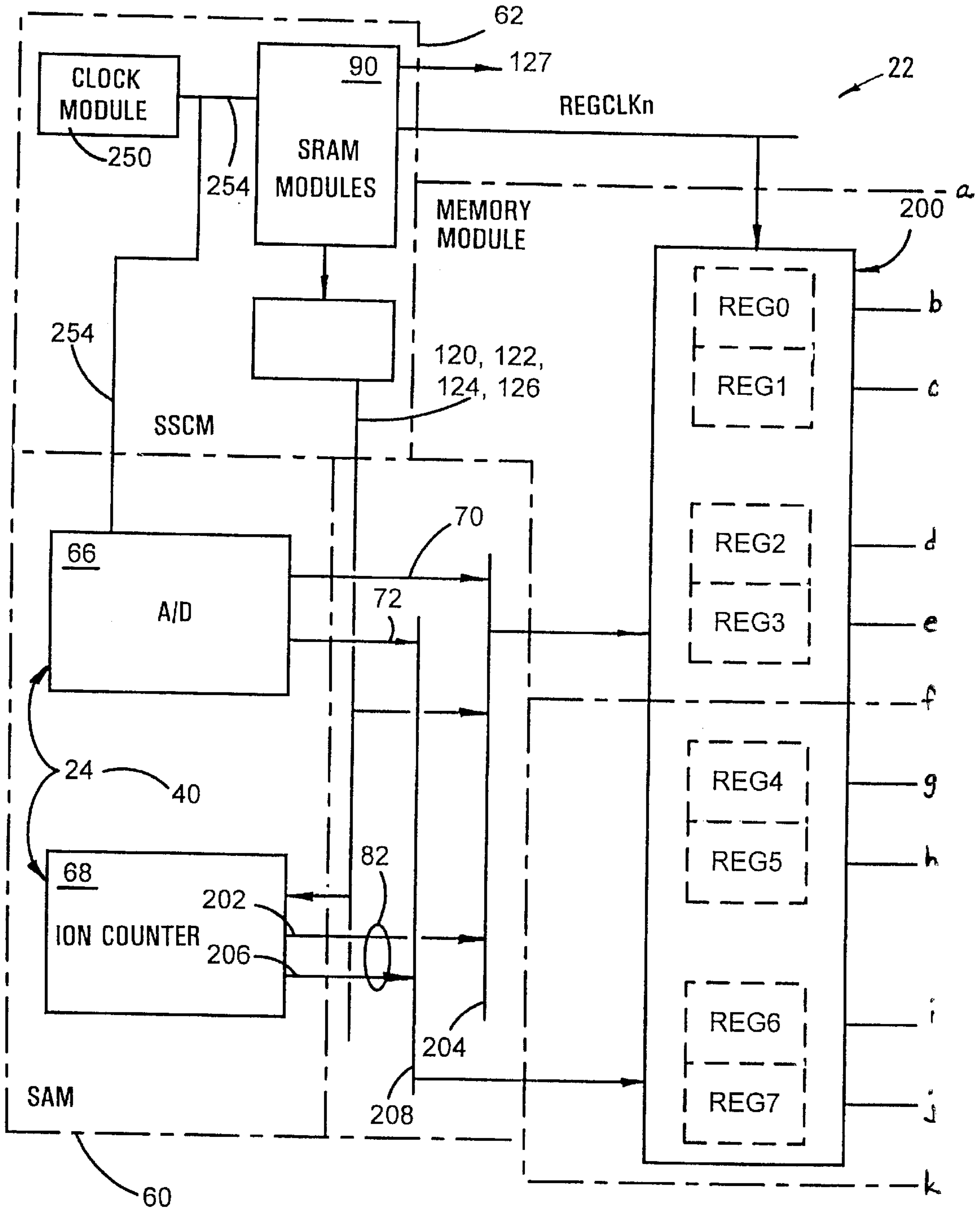
FIG. 3 is an electrical circuit diagram in detailed block form of a data acquisition module shown in FIG. 2.
Figure 3B:
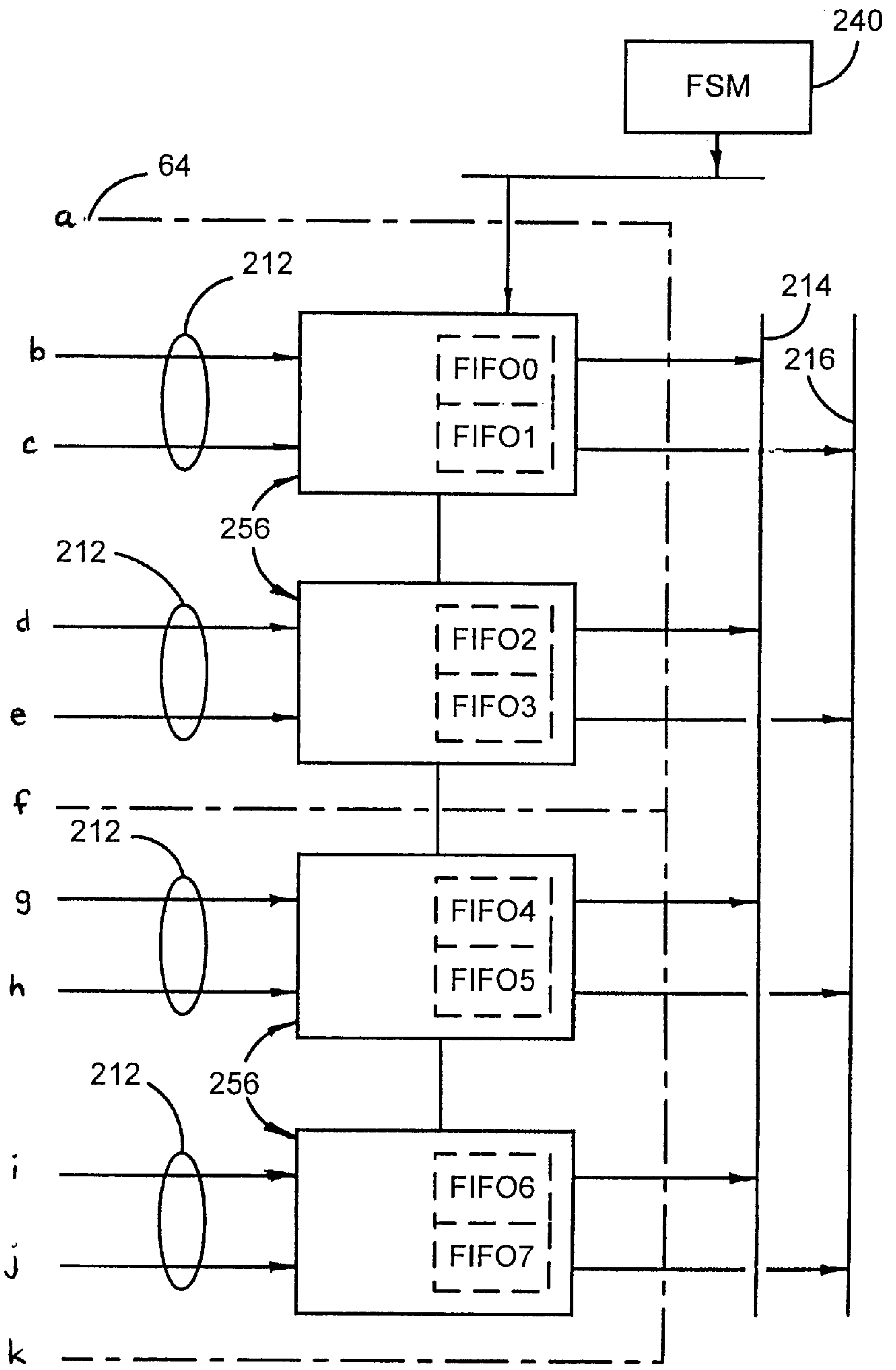
Figure 4:
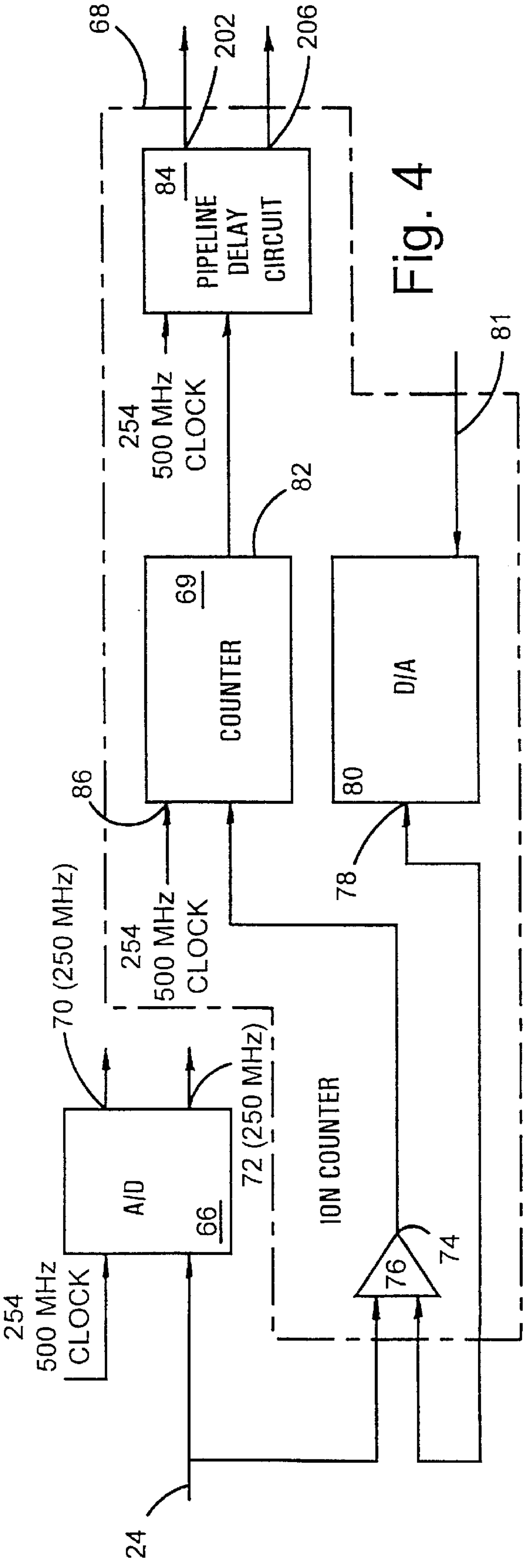
FIG. 4 is an electrical circuit in block and schematic form of a signal acquisition circuit employed in the system of the present invention.

FIG. 3 shows the components of DAM 22, which include a signal acquisition module (SAM) 60, and a sequence and storage control module (SSCM) 62, both providing data and control bits to a register or memory module 64. More particularly, SAM 60 includes an analog-to-digital (A/D) converter 66 and an ion counter 68 connected to pre-amplifier circuit 40 for receiving data from input 24 (FIGS. 3 and 4). In the preferred embodiment, A/D convertor 66 is a track and hold A/D converter, having an 8-bit output, and most preferably a 10-bit output capable of operating at a frequency on the order of 500 megahertz. The A/D converter 66 also includes two outputs 70, 72 upon which data are toggled for reasons which will become more apparent below. As seen in FIG. 4, parallel ion counter 68, shown by dashed lines, includes a discriminator amplifier 76 configured to receive the analog signal provided by input 24, as well as an analog threshold or reference signal provided on output 78 of a digital-to-analog (D/A) converter 80. The output analog signal level may be controlled by digital input signals provided by a signal processor to input terminals 81. If the input on line 24 equals or exceeds the level of output 78 applied to discriminator 76, a signal is output on 74 to counter 69, which, in turn, produces an output over 82 (202, 206, FIG. 3) to a pipeline delay circuit 84 (FIG. 4) to indicate that the signal threshold has been satisfied. For each input to discriminator 76 on line 24 which does not satisfy the threshold, a zero is output at 82 to pipeline delay circuit 84. However, ion counter 69 only produces an output at 82 when enabled by a signal applied at input 86 from the SSCM 62.

Figure 5:
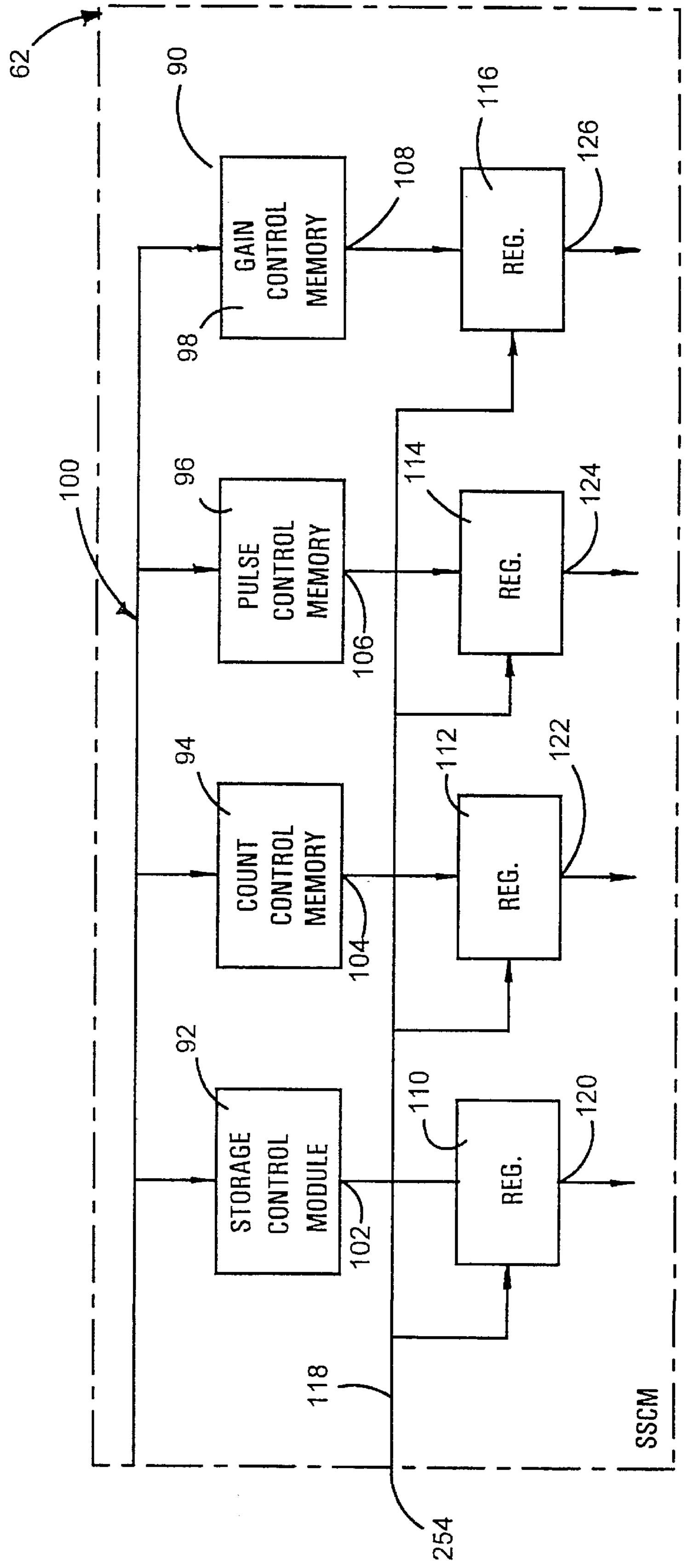
FIG. 5 is an electrical circuit in block diagram form generally illustrating a sequence and memory time base circuit employed in the data acquisition system shown in FIG. 2.

SSCM 62, shown in FIGS. 3 and 5 through 7, controls the collection of data from A/D convertor 66 and/or ion counter 68, as well as controlling the timing of the modulation, extraction, and deflection pulses in the TOF mass spectrometer. In addition, SSCM 62 controls the gain of the analog input 24 produced by pre-amplifier circuit 40 by providing a gain control signal to input 125 (FIG. 2). As seen in FIG. 5, SSCM 62 includes several static random access memory modules 90, including a storage control memory 92, a count control memory 94, a pulser control memory 96, and a gain control memory 98, each coupled to an address line 100 receiving programming data from ICM 32. Preferably, each memory module is capable of storing approximately 4000 different data strings, with each data string including eight or more data bits. Each bit of data stored in each of the memories represents a 2 nanosecond segment or sample of time. The outputs 104, 106, and 108 of each memory 94, 96, and 98, respectively, are connected to associated parallel-in, serial-out 8-bit registers 112, 114, and 116, respectively. Each register 112, 114, and 116 receives 500 MHz timing pulses from a clock pulse line 118. Each register is thus loaded with 8 bits of information every 16 nanoseconds and the data is transmitted from each register serially every 2 nanoseconds. The output 120 of register 110 includes an 8-bit word wherein each bit is sent to one of eight registers in 200, described in greater detail below. Each of these bits constitutes a store/discard signal which identifies the data in that particular register as data to be stored and later processed or data to be ignored.

The data loaded into static ram memories 90 are dictated by the ions of interest identified by the user in computer 27 interfacing with system 20 through ICM 32 via line 36. The particular projected arrival times of the ions of interest are determined by standard tables which are then used to identify what 2 nanosecond windows of data are to be collected. Output 120 from storage control register 110 is combined with data output on one or the other outputs 70, 72 of A/D convertor 66 and outputs 202, 206 from ion counter 68 onto a particular input of a register in 200 described below, to identify or tag the digital signal as one that is of interest and later stored for processing. For example, if a particular 8-bit segment of data is collected in a 2 nanosecond window wherein an ion of interest was to have arrived, the A/D digital signal as well as the ion count output would be temporarily stored in a specific register. One input of that register would have a "1" indicated thereon to flag this data as data of interest and should be retained. Data, wherein the specific register input contains a false or zero value, is not saved. In a similar fashion, a positive value or "1" occupies the same bit location in the count control memory output at 122 from control register 112 at the same time as the "true" or "1" to collect and store the A/D data. The output from register 112 enables ion counter 68 at input 86, described briefly above.

The values stored in 94 need to take into account the pipeline delay of A/D converter 66. Note that the pipeline delay of ion counter 68 is also matched to the pipeline delay of A/D converter 66. Data is output in a similar fashion from pulse and gain control registers 114, 116, respectively, to control the timing of the modulation, extraction, and/or deflection pulses in the TOF mass spectrometer and the pre-amplifier gain to the circuit 40.

SSCM 62 (FIG. 3) includes a gain control module 127 (FIG. 6) for controlling the gain of pre-amplifier circuit 40 over a given time interval, as well as a processor identification module 148 for directing which one or more processors in SPM 26 will be responsible for processing the data. In particular, gain control module 127 includes a gain select counter 128 receiving an input from output 126 of gain control register 116 described above. The input over 126 toggles gain select counter 128 to produce an output at 130 connected in parallel to a gain memory 132 and a comparator 134. Gain memory 132 contains gain information for each data collection window to be collected by system 20. The gain information stored in memory 132 is determined by the first few spectra samples analyzed. Where the gain of a particular window caused a clipping of data, or was insufficient or weak, the gain is compensated for by setting the gain to the appropriate level. The corrected gain levels are programmed into the gain memory 132 over line 135 connected to ICM 32. Each time gain select counter 128 is toggled, the output at 130 causes gain memory 132 to select a new gain value for the next or appropriate data window. The output or new gain value at 136 is connected in parallel to a gain pipeline register 138 and a read back buffer 140. The appropriate gain value for pre-amplifier circuit 40 is output at 142. The output at 144 produced by buffer 140 may be transmitted over line 135 to ICM 32 over line 13 for the purposes of diagnostics. Gain select counter 128 is reset after a particular number of gain settings corresponding to the number of data windows is completed. A window count 170 is pre-programmed by ICM 32 over lines 13 and 145 to correspond to the number of inputs at gain select counter 128. Window count 170 outputs a signal indicating the number of data windows collected which is compared to the output 130 from gain select counter 128. When the output at 130 equals that output at 172, an output 146 causes gain select counter 128 to reset to zero and begin again. As briefly mentioned above, processor identification module 148 identifies which one or more processors in SPM 26 is responsible for processing the data collected by system 20. Additionally, module 148 also records the gain setting at the time that a data sample was recorded.

Many high speed A/D converters use a technique known as "pipelining." In this technique, the A/D converter 66 takes a sample at a certain time interval, i.e., every 2 nanoseconds. But when a particular sample is output from the A/D converter 66, as much as 30 nanoseconds may have transpired and the gain at the time of output may be different. To ensure that the proper gain setting is married to the correct data sample, a pipeline delay 84, connected to input 126 and to clock pulse line 118, has stored therein a value representing the delay inherent in the A/D converter 66. An output 149 of pipeline delay is connected to a stored gain and processor identification (PID) counter 150, which, when toggled by output 149, produces an output 152 received by stored gain and PID memory 154. Stored gain and PID memory 154 contains the same information as contained in gain memory 132 described above, but the output 158 connected to stored gain and PID pipeline register 160 is delayed from the gain changes set to the pre-amp on 142 by the stepping-index or delay inherent in the A/D convertor 66. The output on 158 also identifies the particular processor in SPM 26 responsible for receiving and processing the data sample. The PID tag attached to the gain information and output by memory 158 is also preassigned by the programming in ICM 32 according to the number of processors within SPM and the number of data samples to be tagged, stored, and processed. Presently, the preferred embodiment of the invention will allow the user to snap-fit in the described number of processors much like computer cards are snapped into PCs. Just as with the digital data of the signal, the ion count bit, the store/discard bit, gain information, and PID designator are added to the data stream of each sample collected.

Also comprising a portion of the SSCM 62, and more specifically, a portion of pulser control memory 96 and register 114, is a TOF mass spectrometer period counter module 180 (FIG. 7) configured to control or regulate the cycle time or period of the TOF mass spectrometer. In particular, a counter 182, preferably a 12-bit counter, receives a pulse clock input, or PCLK, from a clock generation circuit described below. The output 184 of counter 182 is connected to a comparator 190 and to line 100 providing the acquisition and storage control address to each of the static ram modules 90 described above. As each clock pulse PCLK toggles counter 182, the output at 184 is increased by one to memories 92, 94, 96, and 98, causing each to output an 8-bit word of data from each location every 16 nanoseconds. However, if it is preferred that the TOF mass spectrometer have a period of 20 microseconds, counter 182 will make up to 1250 counts to complete a 20 microsecond period, for each count identifies an 8-bit location in each memory in static ram 90, for a total of 10,000 bits. Since each bit location corresponds to a 2 nanosecond segment of time, the total time constitutes the 20 microsecond period. The counter 182 is reset by the value stored in a termination register 186 having an output connected to comparator 190. When the count and the termination count are the same, output 192 on the comparator resets counter 182.

Referring again to FIG. 3, system 20 includes a memory module 64 which is configured to receive all of the data digitized by A/D converter 66, ion counter 68, and the accompanying labeling data provided by SSCM 62. In particular, and in reference to FIGS. 3 and 8 through 10, memory module 64 includes a plurality of registers 200, preferably emitter coupled logic to transistor-transistor logic (ECL/TTL) registers. As FIG. 8 suggests, it is preferred that eight registers 200 be used, each designated REG0 through REG7 and arranged in parallel. Registers REG0 through REG7 are connected to the outputs 70, 72 of A/D converter 66, outputs 202, 206 of ion counter 68, and to the outputs 120, 164 of registers 110, 160 (FIG. 5). These outputs provide the store/discard bit 110, the 10-bit A/D signal 70, 72, the ion count bit 202, 206, the 4-bit gain signal 164, and the 2-bit PID signal 164 described above.

Figure 8:
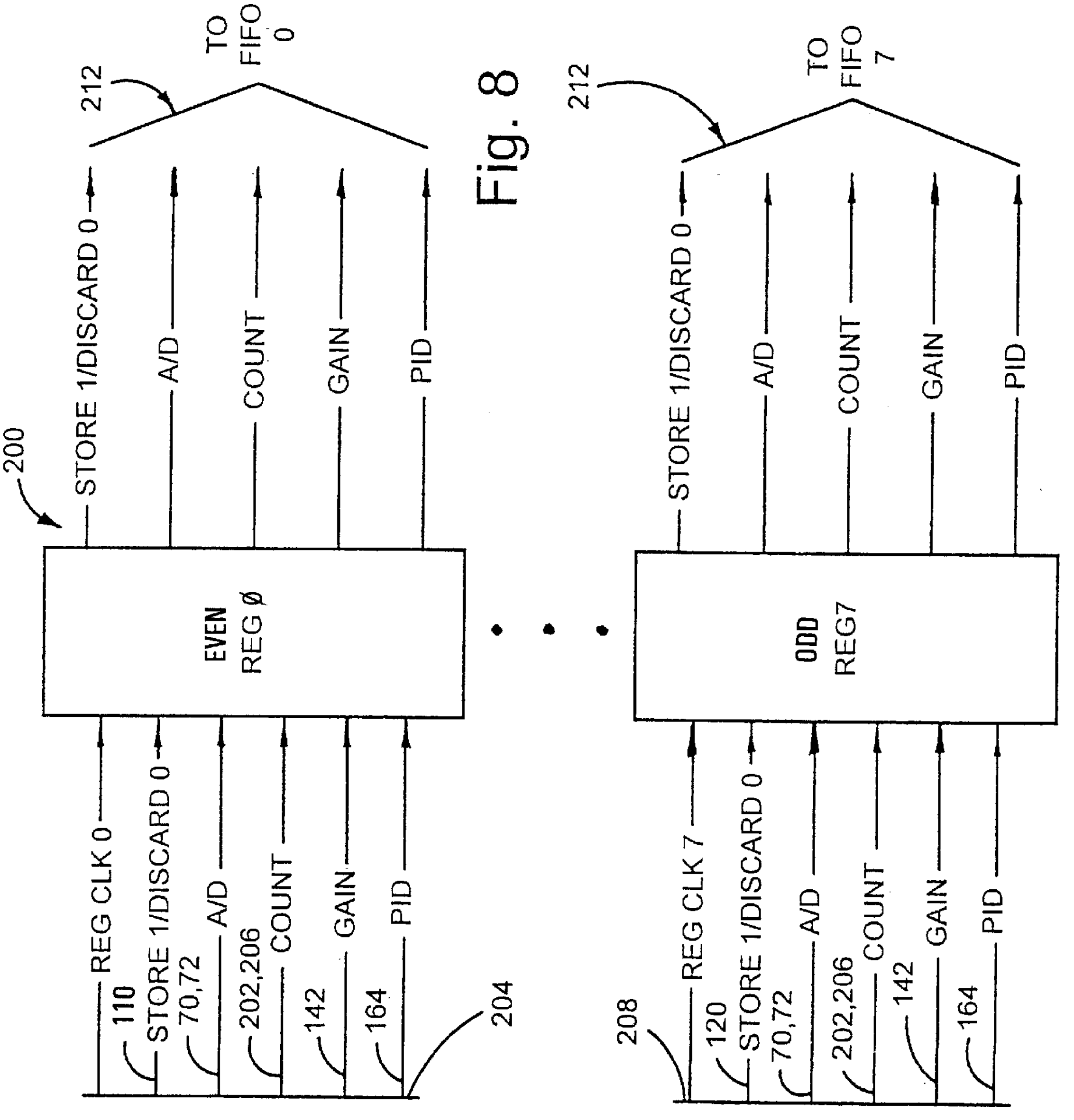
FIGS. 8, 9, and 10 are block diagrams generally illustrating a memory circuit employed in the present invention.

To reduce the duty cycle of the memory module 64 and to increase the period of the TOF mass spectrometer, it has been found that if the data from A/D converter 66 and ion counter 68 are divided among many registers and processed in parallel, the objectives of the invention can be achieved. Accordingly, it is preferred to connect output 70 of A/D convertor 66, as well as the even output from ion counter 68, shown schematically in FIG. 3 as output 202, onto a bus 204 connected to EVEN registers, designated REG0, REG2, REG4, and REG6 (FIG. 8). Also connected to this bus and the appropriate inputs on the EVEN registers are the sequencing and storage control data including the store/discard bit, the gain bits, and the PID bits. Likewise, the ODD outputs, including output 72 on A/D convertor 66, output 206 of ion counter 68, and the associated sequencing and storage control data, are connected to bus 208 interconnected to the ODD registers designated REG1, REG3, REG5, and REG7. Additionally, each of the registers 200 are connected to a dedicated clock output, generally designated REGCLKn where n is the register number. As briefly mentioned above, the storing of each data sample on one of the eight registers 200 reduces the operation bandwidth requirements from 500 MHz to 62.5 MHz per register. At this point, it is also preferred to convert the character of the signal from ECL to TTL in order to account for the greater availability of TTL logic components. It is contemplated ECL logic may be used throughout; however, certain components may need to be customized in order to carry out the operations.

Figure 9A:
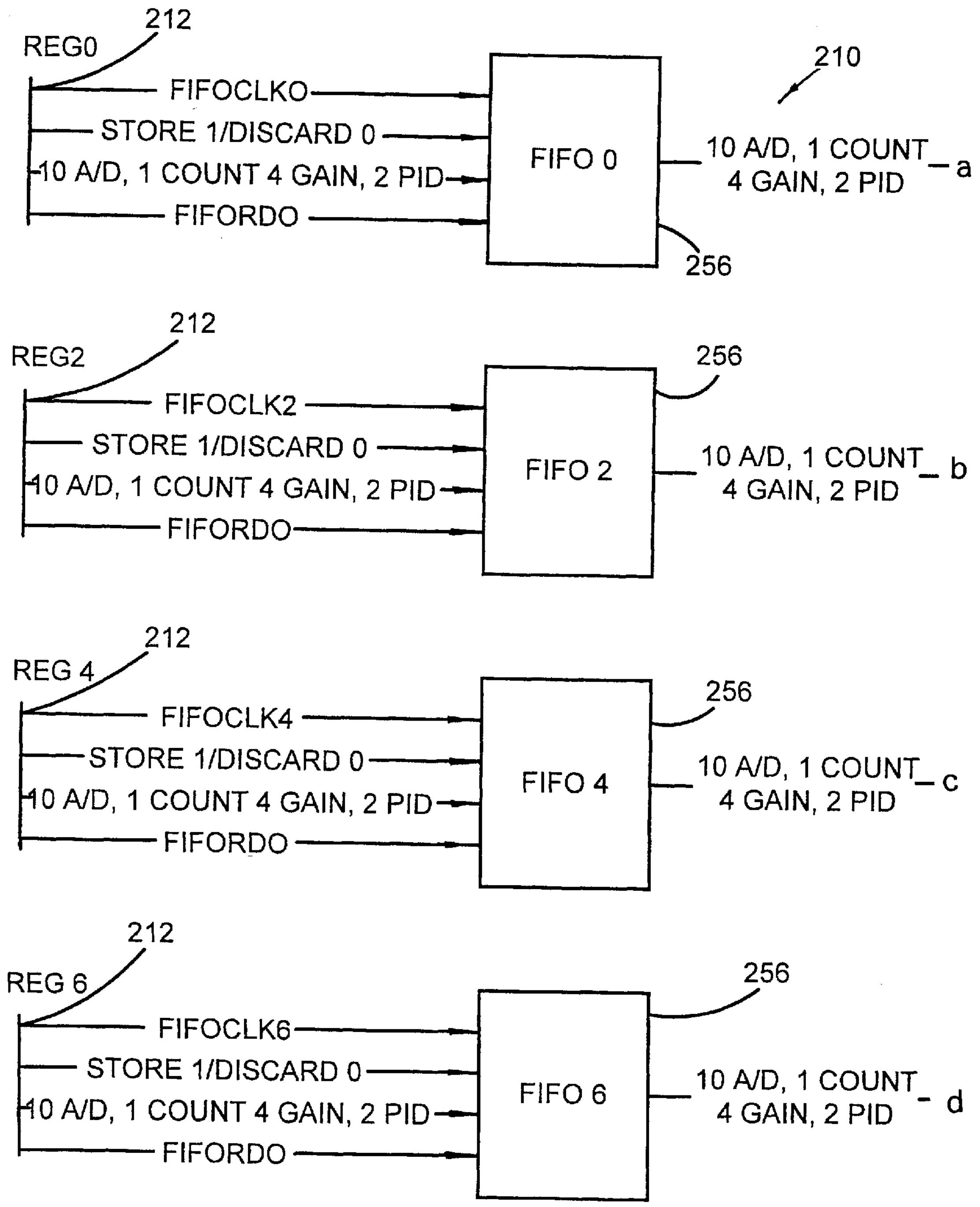
Figure 9B:
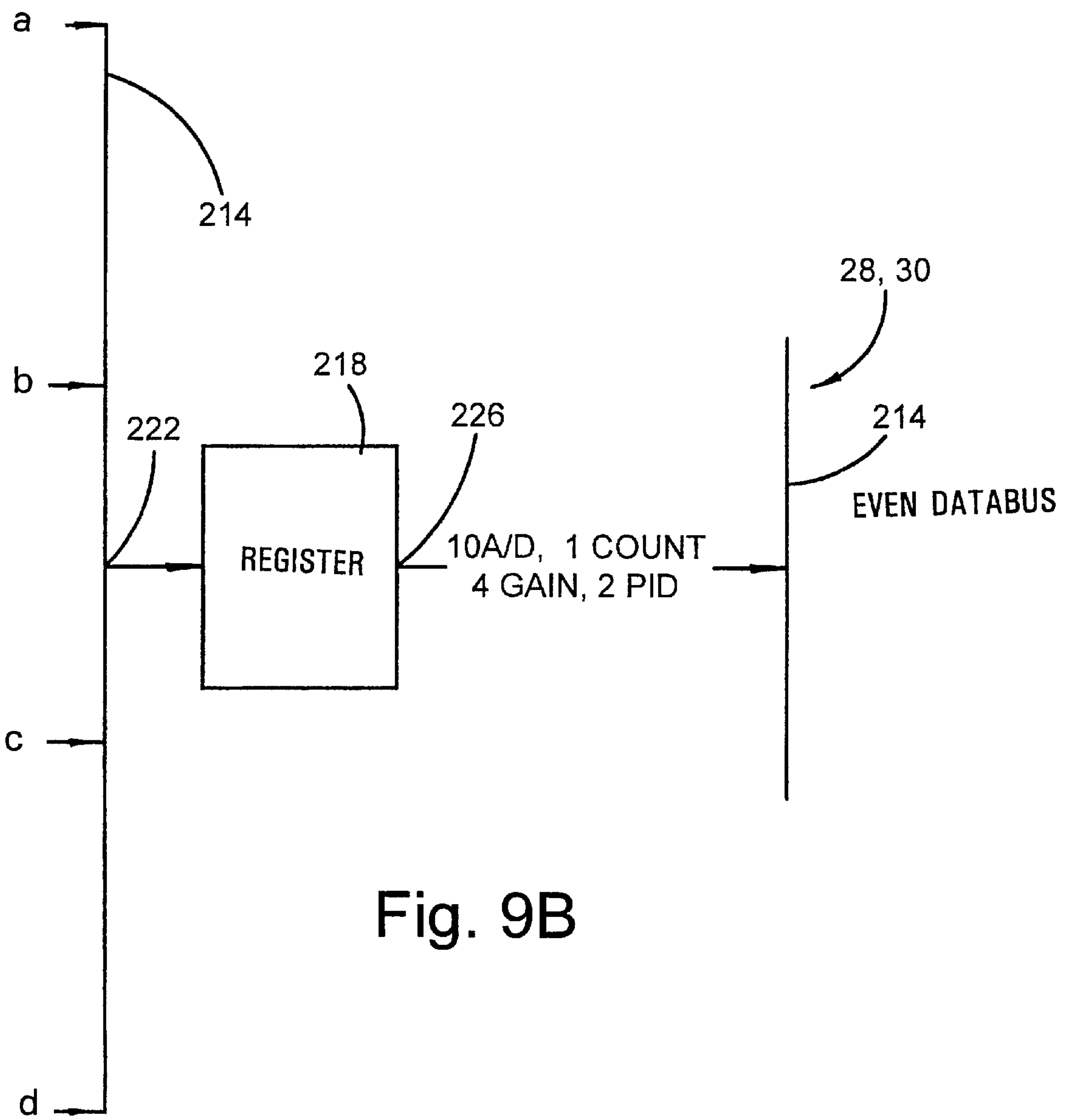
Figure 10A:
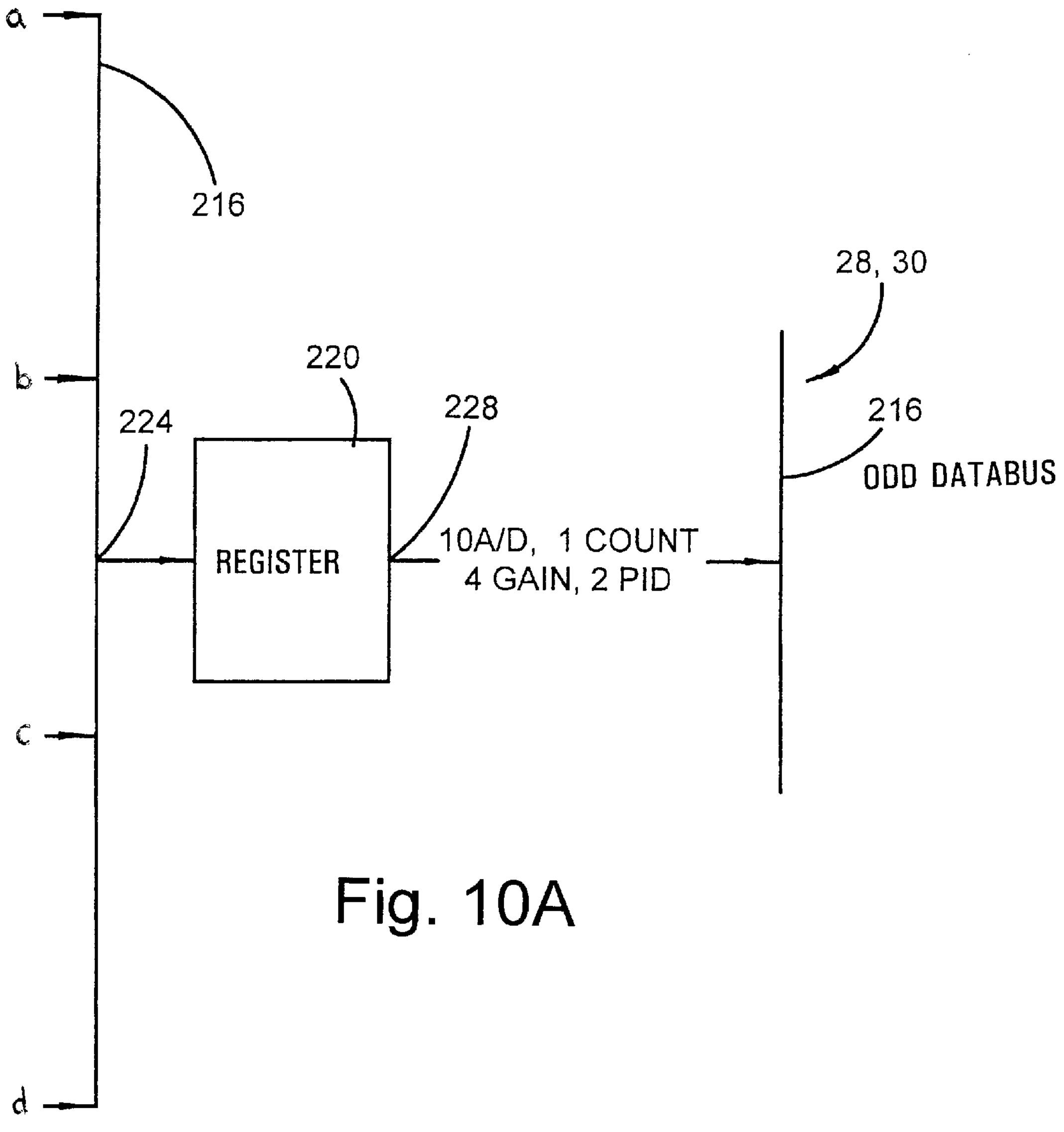
Figure 10B:
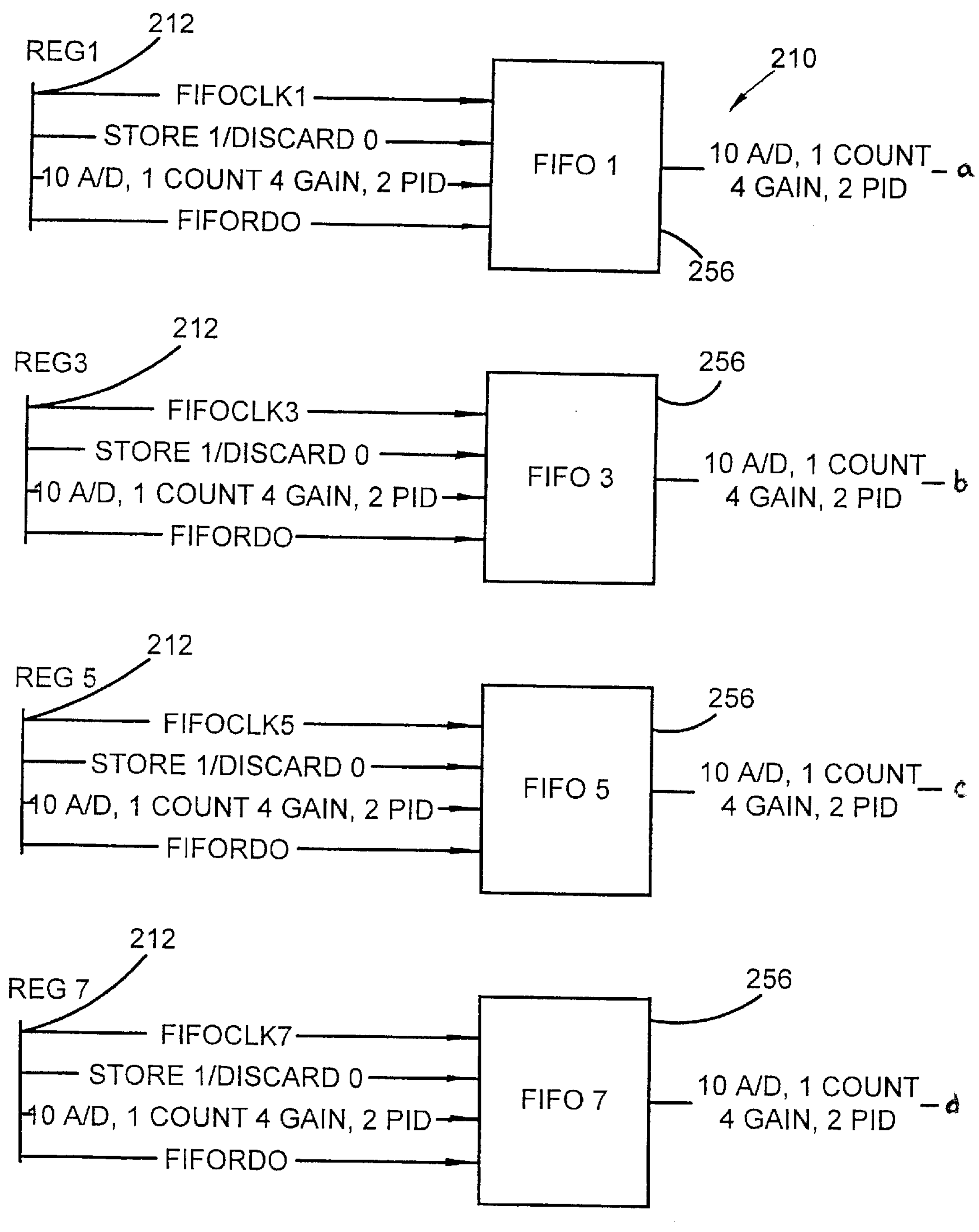
Figure 11:
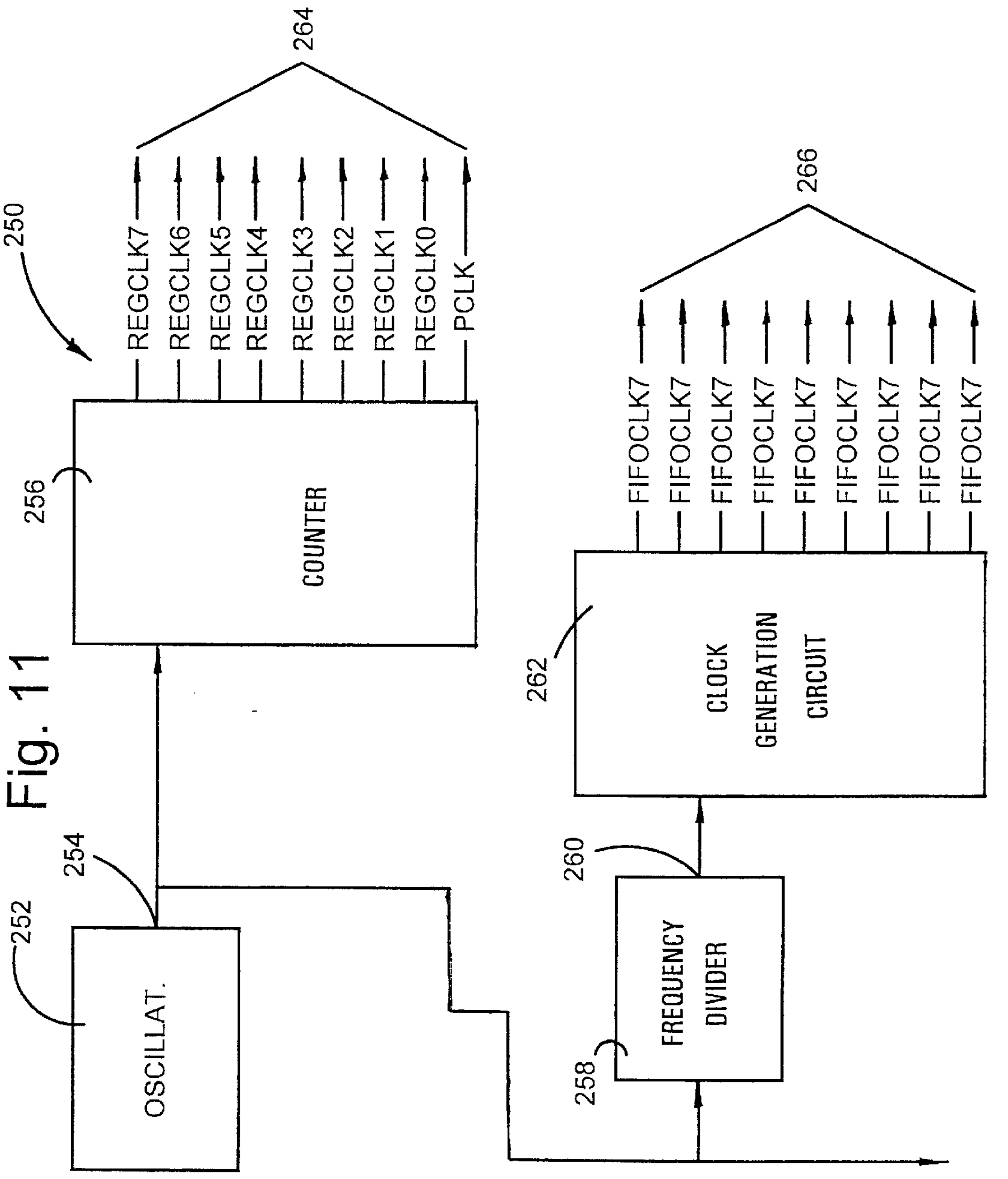
FIG. 11 is an electrical circuit in block diagram form generally illustrating a clock pulse generation circuit employed in the sequence and memory time base circuit.

Interconnected to the outputs of the registers 200 are TTL logic FIFO memories 210, each dedicated to a respective one of the registers REG0 through REG7 (FIGS. 9 and 10).

For the purposes of this discussion, a particular register 210 is identified by the designation FIFOn, wherein n represents the FIFO address and corresponds to one of the eight registers described above. Each FIFOn receives the output of its register REGn across a dedicated hardwired bus or data line generally indicated as numeral 212. Each FIFOn memory preferably includes an 18-bit register having 256 addressable locations. As each FIFOn begins to receive data, the data from each FIFOn are read out sequentially according to FIFO address onto EVEN and ODD data buses 214, 216, respectively. Registers 218, 220 interconnect the outputs 222, 224 of the EVEN and ODD FIFOs, respectively, through their output 226, 228 to the EVEN and ODD data buses 214, 216.

The transfer of data from FIFOn to the EVEN and ODD buses 214, 216 is controlled by an autonomous finite state machine (FSM) 240, shown in FIG. 3 above memory module 64. FSM 240 detects the presence of data in FIFOn, and causes the data to be read out onto the data buses 214, 216. If data is present in all FIFO registers 210, FSM 240 will readout data from the EVEN and ODD FIFOs simultaneously. For each group of ODD and EVEN FIFOs, the data will be read sequentially from each FIFO. For example, FIFO0 location 0, FIFO2 location 0, FIFO4 location 0, etc. The data are sequentially output onto EVEN bus 214. At the same time, FSM 240 reads data from the ODD FIFOs sequentially; for example, FIFO1 location 0, FIFO3 location 0, FIFO5 location 0, etc. This data is output onto data bus 216 parallel simultaneously with the data from the EVEN FIFOs.

Figure 13A:
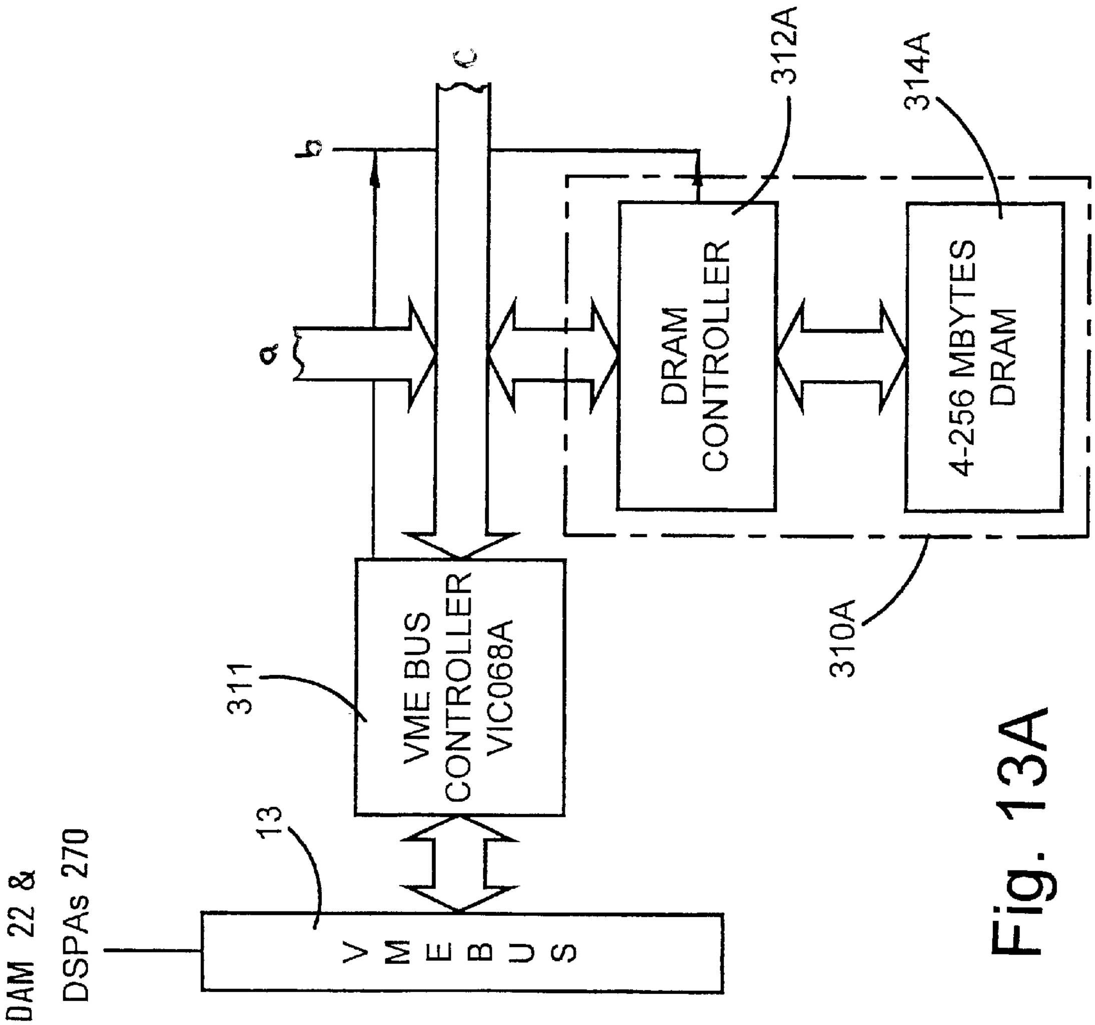
FIG. 13 is an electrical circuit in block diagram form generally illustrating an instrument control module circuit.
Figure 13B:
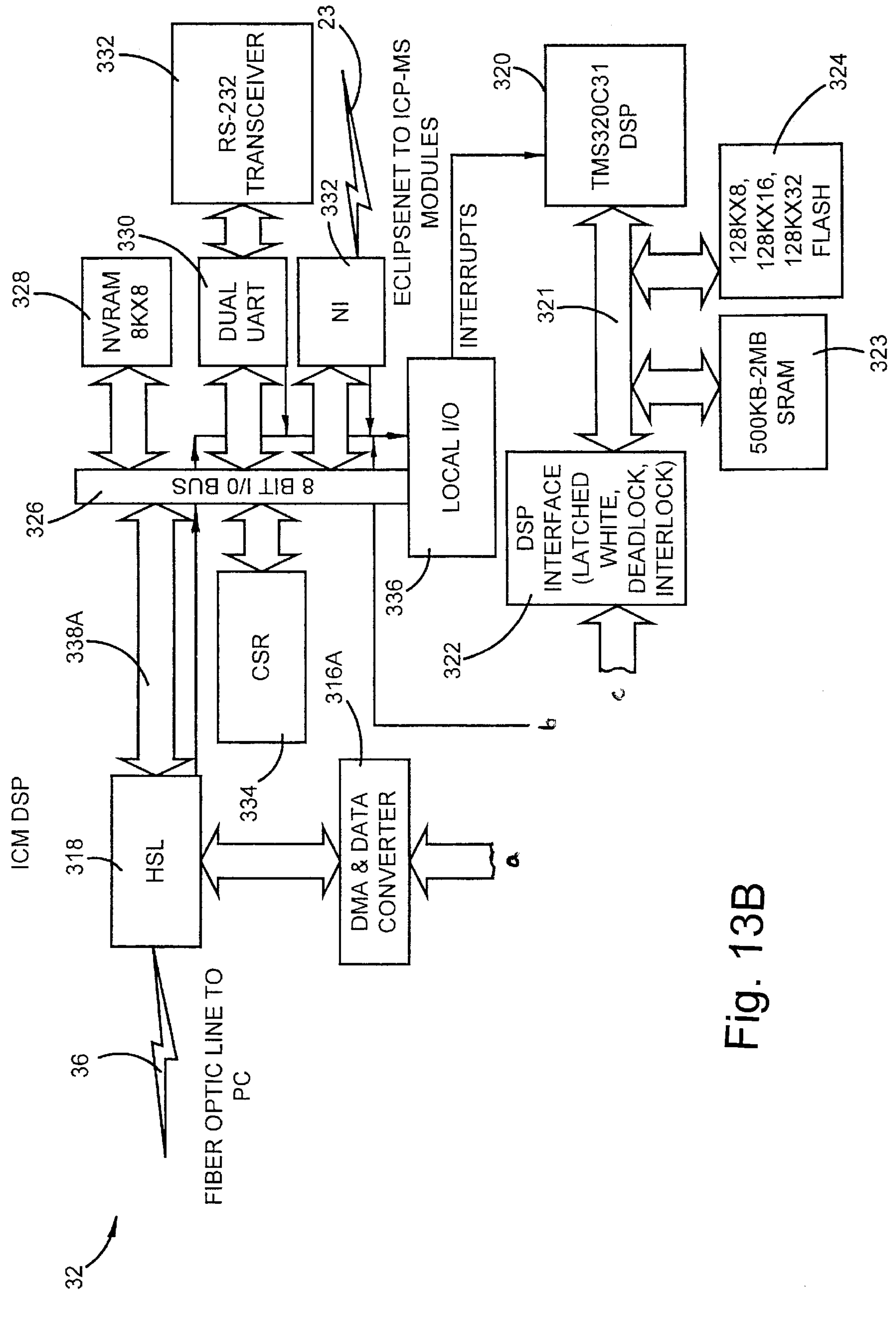

The timing of all operations transpiring within system 20 is based upon a clock pulse produced by SSCM 62. In particular, SSCM 62 includes a clock module 250 having an oscillator 252 operating at a predetermined frequency (see FIGS. 13 and 14). In a preferred embodiment, oscillator 252 generates a 500 MHz signal output at 254 to the various components. The 500 MHz signal output at 254 is connected to A/D converter 66 (FIG. 4) and pipeline delay register 84 (FIG. 5), as well as counter, pulser, and gain control registers 122, 124, and 126, respectively, through line 118. In addition, output 254 is connected in parallel to a JOHNSON COUNTER 256, operating at the same frequency, and to a frequency divider 258. Frequency divider 258 produces an output pulse at 260 equal to ⅛ of the clock pulse, or 62.5 MHz. Output 260, in turn, is connected to a clock generation circuit 262. The outputs, generally designated as 264 and 266 for each of the respective counters 256, 262, provide the appropriate clock pulse to the appropriate device within DAM 22.

Figure 12A:
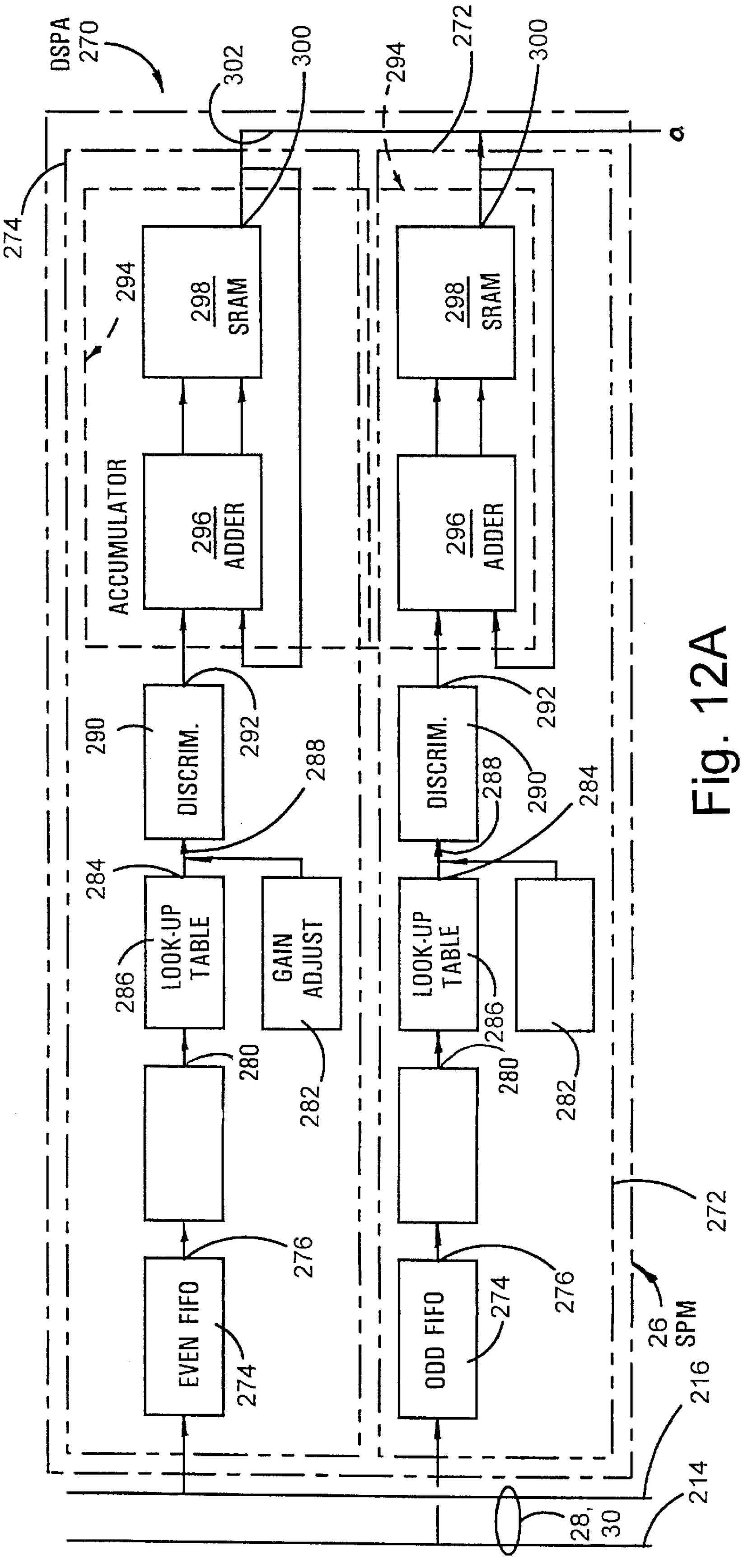
FIG. 12 is an electrical circuit in block diagram form generally illustrating a digital signal process and accumulator circuit employed in the data acquisition system shown in FIG. 2.
Figure 12B:
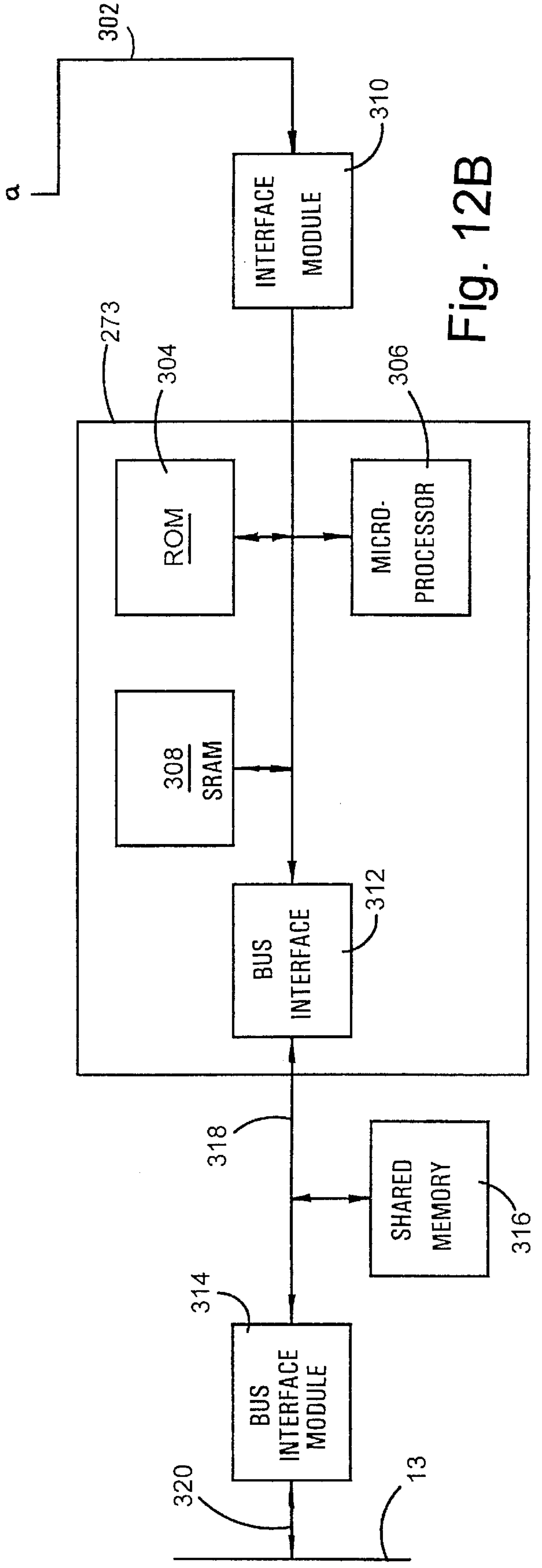

Referring to FIG. 1, SPM 26, operably connected to receive data from DAM 22, initially processes the data and outputs the data over bus 13 to ICM 32. More particularly, and in reference to FIG. 12, SPM 26 includes one or more processors, such as shown, generally designated as digital signal processors and accumulator cards (DSPAs). Although it is contemplated that one DSPA 270 may be adequate in some operations, more than one DSPA is preferred and most preferably four such cards are used, each addressable as DSPA0, DSPA1, DSPA2, and DSPA3, in accordance with the digital address assigned to each digital signal by the PID module 148 described above. However, for the purpose of this description and clarity only one DSPA is shown.

Each DSPA is responsible for the first stage processing of the data from A/D convertor 66. As each data word or signal is transferred to the respective DSPA, it is received by either its EVEN or ODD input FIFO 274 before being output at 276. The data output at 276 is separated into A/D-gain data and ion-counter-gain data. The two digital signals are sent down separate paths along output 280 with each portion maintaining its own tag or label. The data from A/D converter 66 is used in case the ion counter 68 data does not satisfy a particular parameter described below. This is done to prevent using invalid data from the ion counter 68. The software running on the microprocessor 306 will determine if the ion counter data is valid by verifying that the number of ions (counts) per second was small enough that there was a low probability that more than one ion had struck the detector at a time. This ensures that the ion counter was not saturated.

In a preferred embodiment of the invention, the data from A/D convertor 66 are adjusted at 282 using the value of the gain. This justification of the data ensures that all samples are equalized to the same reference. Justification occurs preferably after the data passes through a look-up table module 286 and output at 284. The adjusted values from A/D convertor 66 are output at 288 to a digital discriminator 290 where the data are compared against a programmed threshold. If the data value is less than the threshold, the data are discarded. If the adjusted value meets or exceeds the threshold, then the data are output at 292 to the accumulator portion 294 of the DSPA. The accumulator portion of DSPA includes an adder 296 receiving the adjusted value from output 292. Adder 296 is indexed by the data transfer and the adjusted value is added to a previous value stored at this location in a static random access memory (SRAM) 298, output over 300 to adder 296. The result of the addition is then stored in SRAM 298. In this manner, samples of a given analyte which were collected over many spectra are summed together. This process continues until the result from the addition causes an overflow condition or until a sufficient number of samples have been collected. A "sufficient number" of samples is determined by the particular program parameters set by the operator.

When the data from accumulator 294 are output, either because the accumulator is about to overflow or upon a command, the data are output at 300 to a bus 302 connected to interface module 310. The purpose of accumulator interface 310 is to transfer the results accumulated thus far to the microprocessor on the DSPA card. This function allows the transfer to take place without missing any of the incoming data from DAM 22. Some accumulators require some "dead time" to transfer their results. This causes some number of samples to be lost while the accumulator transfers its results. Once the data have been transferred to the processor 306, then the software which processor 306 is executing will continue the process of accumulating. In addition this software will examine the A/D data and ion-counter data and decide which of them is valid as described above. If the data from the accumulator are the first samples, then the software running on the DSPA will determine the gain settings to be used and pass this information to the ICM. This data will then be discarded. If the gain settings have already been determined, then the data from the accumulator will be summed to the data previously collected by the DSPA. This data will be summed in such a manner as to maintain the chronological order. Once the DSP has collected all of the data required, then it will be transferred to the ICM via bus 13.

DSPA 270 further includes a read-only, non-volatile memory (ROM) module 304 operably connected to bus 302 and microprocessor 306. Microprocessor 306 interrogates ROM 304 as well as DSPA 270 according to the program stored therein. Data gathered by microprocessor 306 are stored in a second SRAM 308 also connected to bus 302.

Bus 302 is operably connected or otherwise in communication to accumulator circuits through an accumulator memory interface module 310 and a bus interface 312, respectively, both of which permit data transfer thereacross. Bus interface 312, in turn, is connected to a bus interface module 314, such as a VME bus, and a shared memory 316 through line 318, which permits two-way communication through interface 312 to microprocessor 306. Bus interface 314, in turn, is connected in two-way communication through line 320 to a VME bus 13 in a conventional manner. VME bus 313 is operably connected to ICM 32 which provides programming commands and instructions to the various modules or systems comprising the data acquisition system embodying the invention.

ICM 32 (FIG. 13) is responsible for setting up all of the data acquisition parameters. Many of the parameters are dictated by the program within the PC connected thereto. Other parameters, such as gain settings for the pre-amplifier 40, will be established by ICM 32 after the first few samples are collected at the beginning of each analysis. After setting up the acquisition system, ICM 32 initiates the analysis, supervises the determination of the pre-amp gain settings, instructs the DSPA cards to begin processing and storing data, collects the data from the DSPAs, and performs the final processing steps on the data. When requested, it will send the data to the PC. Additionally and simultaneously with the above tasks, ICM 32 is also responsible for seeing the overall operation of the TOF mass spectrometer. These functions are discussed in a co-pending patent application assigned to the assignee of this invention.

ICM 32, shown in FIG. 2, interfaces through the VME bus 13 with the DSPA 270 and DAM 22. This allows ICM 32 to test DSPA 270 and DAM 22 for diagnostic purposes, configure these components for data acquisition, and collect the results from these modules after data acquisition has been completed. The VME bus interface 13 also allows DSPA 270 to access the shared memory 310A on ICM 32. Shared memory 310A includes a dynamic random-access memory controller 312A which controls access to dynamic random-access memory 314A having a capacity ranging between 4 and 256 megabytes. In addition, VME interface 311 permits interprocessor communication to take place with DSPA 270 via a set of dedicated registers in the VME bus interface 311. Also operably connected with the VME interface 311 is a DMA and data convertor 316A provided to transfer the results collected by ICM 32 to the PC 27 (FIG. 1) over bus 36. This dedicated hardware will autonomously read data from shared memory block 310A, convert a specified portion of the data from the digital signal processor format to the personal computer format, and send it to the HSL block 318A. HSL block 318A then uses a proprietary, high-speed serial interface 36 to transmit the results to the PC 27. ICM 32 also provides a digital signal processor 320 operably coupled via bus 321 to the VME bus interface 311 through a DSP interface 322. Also operably connected to bus 321 is a static, random access memory (RAM) 323 as well as a flash memory 324, which provide program and data storage for DSP 320. Flash memory 324 is preferably a firmware chip which may be electrically programmed and erased and may contain as much as one-half megabyte of storage capacity to provide program information to DSP 320. The static RAM 323 serves to provide buffer space for data to and from the DSP as well as storing additional operational software downloaded from the flash memory 324.

Connected in parallel to an 8-bit input/output (I/O) bus 326 is a non-volatile RAM 328 for storing constants, a dual universal asynchronous transceiver 330 which, in turn, is operably connected to an RS-232 transceiver which is used to provide and receive signals from the source 14, as shown in FIG. 1 for the TOF mass spectrometer. Also connected to bus 326 is an NI interface 332 configured to communicate with all of the other modules of the TOF mass spectrometer through line or bus 23, mentioned above and shown in FIG. 1. Also connected to bus 326 is a control and status register provided to retain data generated during parity checks and error information during the operation of the system. It is noted that the 8-bit I/O bus 326 is connected to a local I/O port 336 to bus 321 such that data may be exchanged between DSP 320, shared memory 310, and other memory components of ICM 32. It is noted that 8-bit I/O bus 326 is also operably connected to the HSL 318 through a bus 338 to enable direct transfer of data between the NV RAM 328, dual universal asynchronous transceiver 330, and NI 332.

Figure 14:
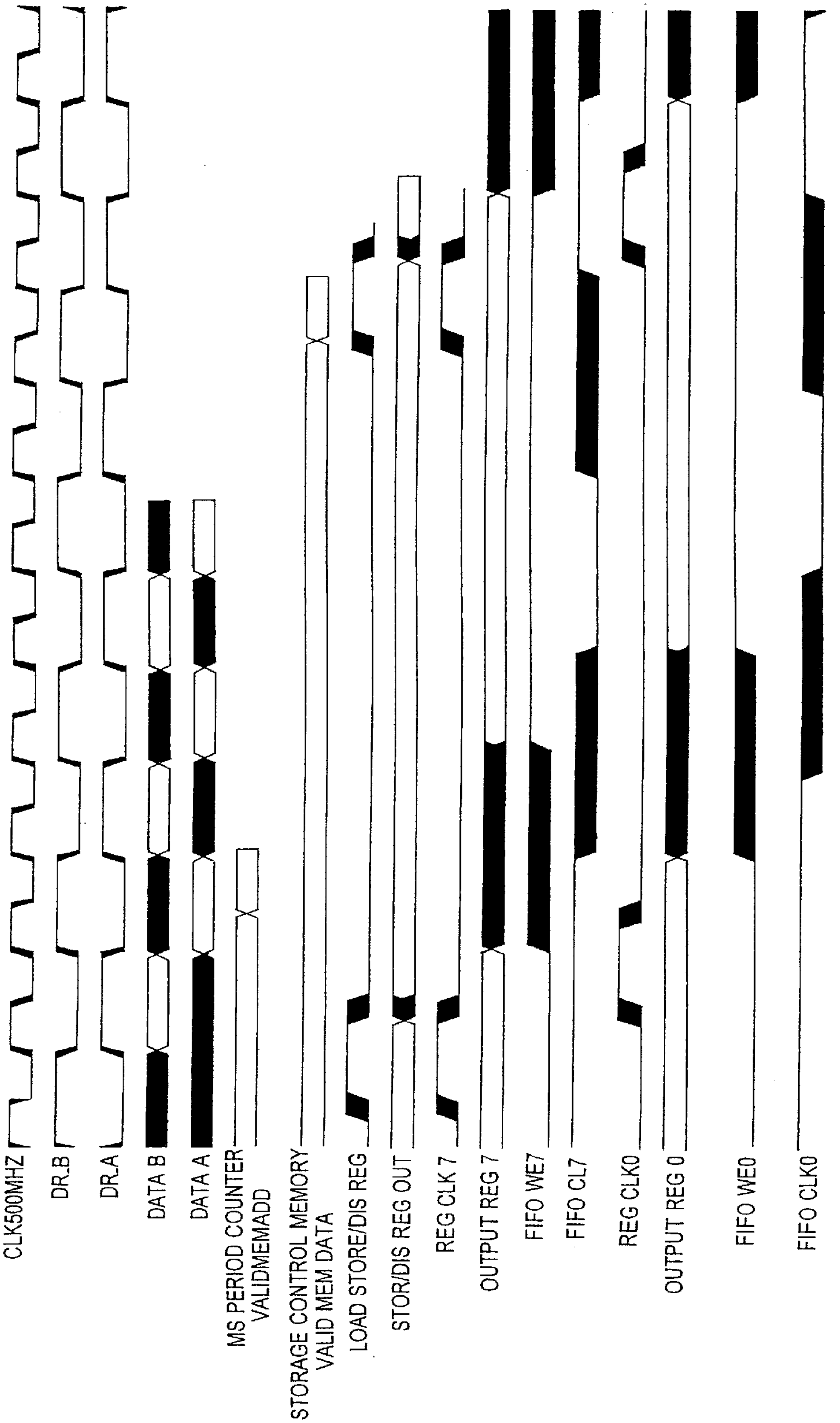
FIG. 14 is a timing diagram of the preferred embodiment.
Figure 15:
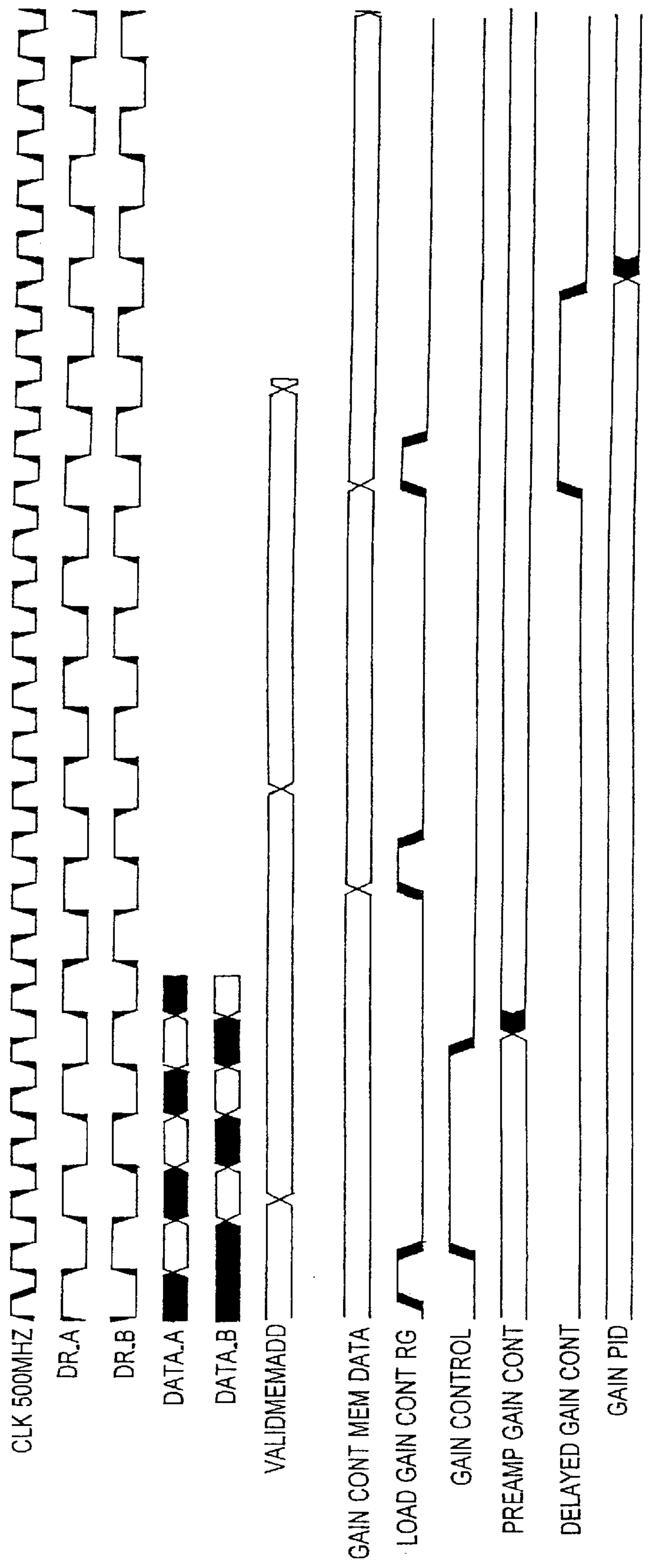
FIG. 15 is a timing diagram for controlling gain of the signal acquisition circuit shown in FIG. 4.

In operation, and in reference to FIGS. 14 and 15, the particular data parameters to be recorded and collected are preprogrammed into the data acquisition system 20 through software commands provided from the PC to ICM 32 which, in turn, transfers those commands to the respective components and modules comprising system 20. Upon the receipt of the first few transient ion pulses accelerated down the TOF mass spectrometer and received by the detector 42, the gain of the analog signals produced therefrom are automatically adjusted by gain control module 127 (FIG. 7) and stored in gain control memory 98. Thus, in effect, the gain is self-adjusting to satisfy a particular range or threshold.

Subsequent to the self-calibration of the gain determined by programmed thresholds and the gain control modules 127, each analog signal produced by detector 42 is converted to a digital signal at A/D convertor 66 and/or into an ion count signal at ion counter 68 (FIG. 4). As briefly mentioned above, ion count signal must be of sufficient strength to register, as determined by the discriminator 76 and reference 80. The two signals, A/D and ion count signals, are passed to the digital acquisition module 22 where they are identified, tagged, or labeled as digital data occurring in one or more specific 2 nanosecond windows of time. Each 2 nanosecond window is calculated by one cycle of the 500 MHz clock pulse (see FIG. 14).

Upon each 2 nanosecond cycle occurrence, A/D convertor 66 flip-flops, alternating data output onto buses 70, 72 at a frequency of 250 MHz, as indicated by the alternating valid boxes identified on time lines DATA_A and DATA_B. The data output from A/D convertor 66 and ion counter 68, as well as the storage and control bits provided by the SSCM 62, are stored temporarily on the registers, dictated by the actuation of the particular register REGn 200 (FIG. 8). With a preferred number of registers REGn, most preferably where n=8, all registers are full after a 16 nanosecond time interval. While in registers REGn, the data undergo a character change, preferably from an ECL signal (high of −0.8 volts and low of −1.6 volts) to a TTL signal (high of 2.5 volts and low of 0.0 volts) which essentially amounts to an amplification and shift in the data signal. Once all the registers REGn are full, the data are transferred in parallel over the dedicated buses 212 to a respective FIFOn. It is at this point that the store/discard bit or label issued to save the data in FIFOn and pass it on to SPM 26 or discards the data by allowing to be overwritten in REGn on the next cycle. The store/discharge bit n is connected directly to FIFOn write enable, thereby directly controlling the storage of a given data sample.

Data output from FIFOs 210 are output in a parallel fashion from the ODD and EVEN numbered FIFOs onto parallel buses 214, 216 to a predetermined one of the DSPAs

270 dictated by the address or PID assigned to the data package by SSCM 62 in DAM 26. This process is substantially controlled by FSM 240 which continually reads the data input into each FIFOn and dictates which data are read from the FIFOs for transmission to SPM 26. Each DSPA pre-processes the data, including adjusting the data to a baseline gain value, called justification, so they may be summed. The data are then stored and output as dictated to the ICM 32 and associated operated controlled software. After being output to the ICM, the data is then transferred to the PC.

Data acquisition system 20 described above contained multiple microprocessors or digital signal processors in ICM 32 and DSPA 270. The multiple digital signal processors provide hardware support for indivisible, read-modify-write operations which are used to access software semaphores. These software semaphores are, in turn, used to guarantee exclusive access to shared hardware and software resources. For example, digital signal processor 306 on DSPA card 270 simultaneously processes data transferred from the accumulator portions 271, 272 while the same sections continue the process of accumulating data. Simultaneously, digital signal processor 320 and ICM 32 (FIG. 13) process the data and interface with the PC, sometimes converting data stored in the shared memory 310 prior to transmission over the HSL 318, 36, controlled by DMA and data convertor 316.

The advantages provided by or resulting from the data acquisition system and method embodying the invention include the ability to collect and process data at nearly twice the rate conventionally available. Additionally, resolution is significantly improved as a result of collecting larger segments of data over a shorter time interval than previously available. This results in sharper and better defined data sets than previously available, making it possible to discriminate between ion species of class mass-to-charge ratios previously undetectable. Furthermore, the data acquisition system and method embodying the invention provide the further advantage of ensuring that all of the particular data of interest are collected since all data are digitized and temporarily stored. In this manner, data are not lost as a result of powering up a system or digitizing circuit just after the ions of interest have already been partially detected.

Figure 16:
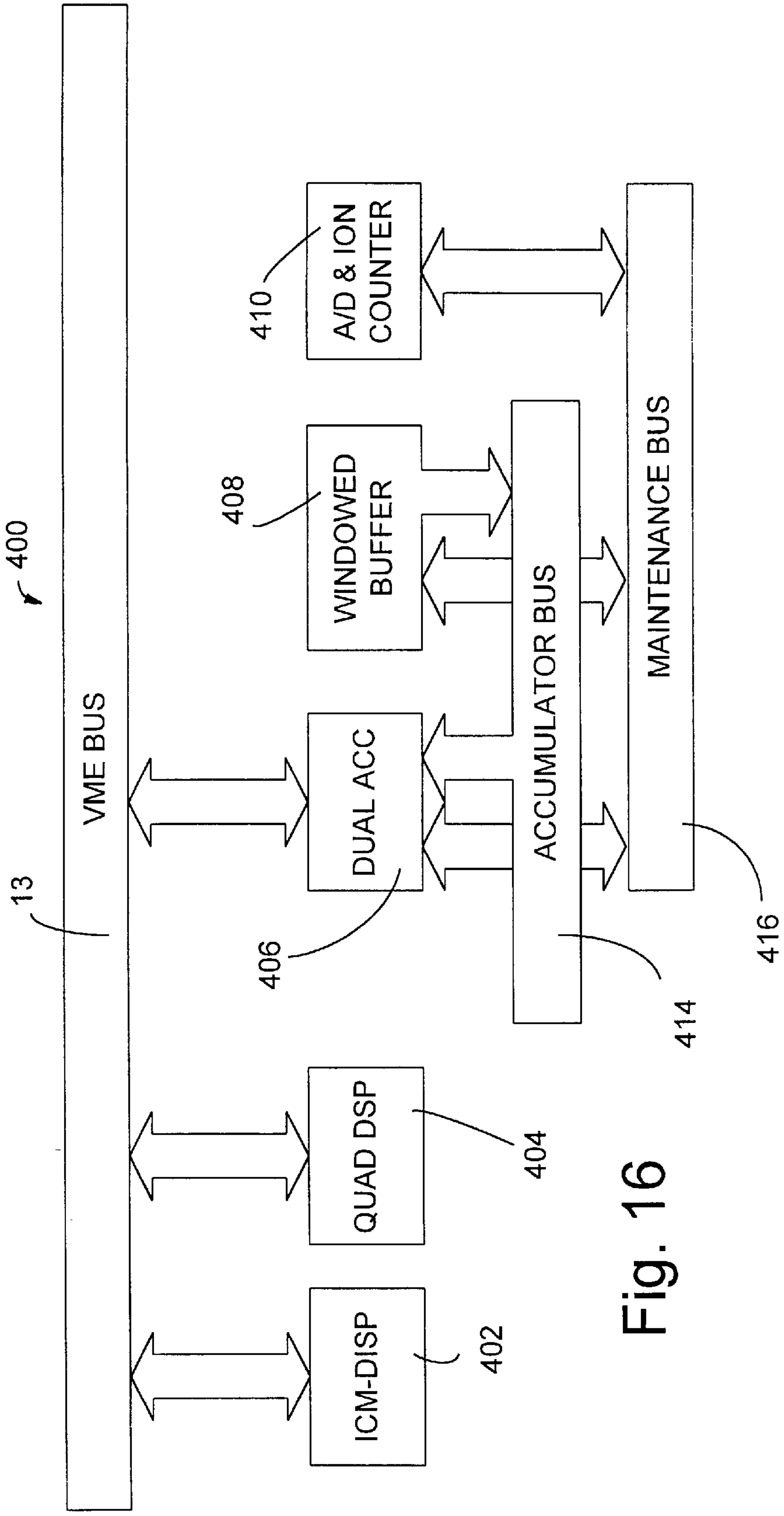
FIG. 16 is a block diagram illustrating the principal components of a data acquisition system according to another embodiment of the present invention.

Referring now to FIG. 16, a data acquisition system 400 for use with time array detection in TOF mass spectrometry is shown in a block diagram according to a second embodiment of the present invention. The data acquisition system 400 includes an instrument control module (ICM) 402, which may be similar in construction and operation to ICM 32 as described in connection with the embodiment of data acquisition system 20 shown in FIG. 2. Data acquisition system 400 also includes a quad digital signal processing (DSP) card 404 and a dual accumulator card 406. The dual accumulator card 406 accumulates collected data, while the quad DSP card 404 preferably contains four digital signal processors for processing the accumulated data for each mass to be analyzed.

The VME bus 13 communicates with each of the ICM 402, the quad DSP card 404, and the dual accumulator card 406. This communication link allows ICM 402 to configure the various components of the Quad DSP card 404 and dual accumulator card 402 for data collection and to collect the results from these cards 404 and 402 after the data collection has been completed.

The data acquisition system 400 further includes an accumulator bus 414 for transferring the collected data strings to be analyzed to the dual accumulator card 406. In addition, the data acquisition system 400 includes a windowed buffer 408 and an analog-to-digital (A/D) converter and ion counter card 410. The accumulator bus 414 communicates with the windowed buffer 408, while the windowed buffer 408 receives data from the analog-to-digital (A/D) converter and ion counter card 410. Also shown is a maintenance bus 416 for receiving data from the VME bus 13 to be used by the A/D converter and ion counter card 410 and windowed buffer 408.

The A/D converter and ion counter card 410 along with the window buffer card 408 provide substantially the same or similar functionality as those components used in the data acquisition module of system 20 as described in connection with the first embodiment of the present invention, with the exception that the gain and processor identification memory of gain control module 127 has been changed according to another embodiment as is described herein.

Figure 17:
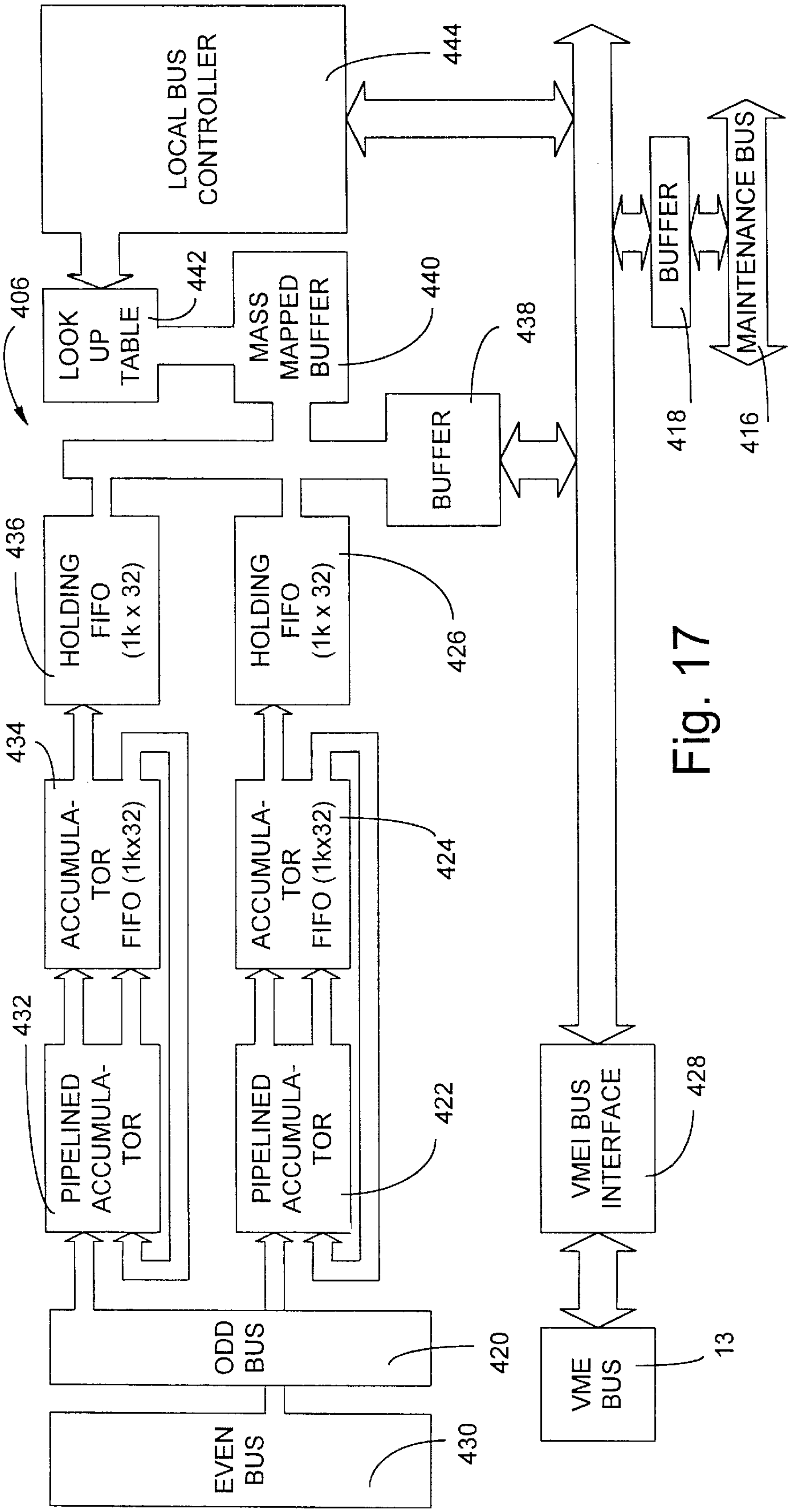
FIG. 17 is a block diagram illustrating the dual accumulator card provided in the data acquisition system of FIG. 16.

Turning to FIG. 17, the dual accumulator card 406 is illustrated therein in greater detail. The accumulator bus 414 includes both an odd accumulator bus 420 and an even accumulator bus 430, each of which receives and stores data from the data buffer card and provides thirteen bits of information containing odd and even samples on the odd accumulator bus 420 and even accumulator bus 430, respectively. Accordingly, the dual accumulator card 406 has two accumulators referred to herein as the odd accumulator and even accumulator. The odd accumulator is made up of a pipelined accumulator 432 which has discrimination, justification, and summation circuitry, and also includes an accumulator FIFO 434 and a holding FIFO 436. The even accumulator likewise has a pipelined accumulator 422 which includes discrimination, justification, and summation circuitry, as well as an accumulator FIFO 424 and holding FIFO 426. The pipelined accumulators 432 and 422 each provide the discrimination, justification, and summation operations of the data accumulation.

The accumulator FIFOs 434 and 424 hold the results output from the respective pipelined accumulators 432 and 422 and sum together a selected number of spectra. The accumulator FIFOs 434 and 424 store the summation of data for one or more full spectra for the odd and even samples held in the odd accumulator and even accumulator, respectively. Once the full spectra are summed, they are transferred to each of the holding FIFOs 436 and 426. Without loss of data summed, spectra are transferred to a mass mapped buffer 440 for storage therein. A local bus controller 444, also referred to herein as a mass mapping controller, maps the data stored in the mass mapped buffer 440 by way of a look-up table 442. Accordingly, both the even and odd accumulator circuits share a common look-up table 442 and mass mapped buffer 440.

With the use of odd and even accumulators, the data is collected in an interleaved fashion and, as a consequence, the collected data ends up being scrambled. The mass mapped buffer 440 and look-up table 442 along with the mass mapping controller 444 are employed according to the present invention to organize the data for each mass-to-charge ratio in consecutive sets of memory locations, without requiring the need for additional software to tag each group of data. To further illustrate the collection, organization, and storage of data to mass mapped buffer 440, the following example is shown in Table A below:

TABLE A

| Time | M/Z | Data Point # | Value | Windowed Buffer FIFO | Even Accumulator Holding FIFO | Odd Accumulator Holding FIFO | Corresponding Look Up Table Location | Desired Mass Mapped Buffer Location |
|---|---|---|---|---|---|---|---|---|
| $T_1$ | 6 | 0 | 1 | FIFO 0 | 0 | — | 0 | 0 |
| $T_1$ + 2 nS | 6 | 1 | 2 | FIFO 1 | — | 0 | 8 | 1 |
| $T_1$ + 4 nS | 6 | 2 | 3 | FIFO 2 | 1 | — | 1 | 2 |
| $T_1$ + 6 nS | 6 | 3 | 4 | FIFO 3 | — | 1 | 9 | 3 |
| $T_1$ + 8 nS | 6 | 4 | 3 | FIFO 4 | 2 | | 2 | 4 |
| $T_1$ + 10 nS | 6 | 5 | 2 | FIFO 5 | — | 2 | 10 | 5 |
| $T_1$ + 12 nS | 6 | 6 | 1 | FJFO 6 | 3 | — | 3 | 6 |
| $T_1$ + 14 nS | 6 | 7 | 1 | FIFO 7 | — | 3 | 11 | 7 |
| $T_2$ | 8 | 0 | 1 | FIFO 3 | — | 4 | 12 | 8 |
| $T_2$ + 2 nS | 8 | 1 | 2 | FIFO 4 | 4 | — | 4 | 9 |
| $T_2$ + 4 nS | 8 | 2 | 3 | FIFO 5 | — | 5 | 13 | 10 |
| $T_2$ + 6 nS | 8 | 3 | 4 | FIFO 6 | 5 | — | 5 | 11 |
| $T_2$ + 8 nS | 8 | 4 | 3 | FIFO 7 | — | 6 | 14 | 12 |
| $T_2$ + 10 nS | 8 | 5 | 2 | FIFO 0 | 6 | — | 6 | 13 |
| $T_2$ + 12 nS | 8 | 6 | 1 | FIFO 1 | — | 7 | 15 | 14 |
| $T_2$ + 14 nS | 8 | 7 | 0 | FIFO 2 | 7 | — | 7 | 15 |

The collected data is stored in even and odd accumulator holding FIFOs 426 and 436 to minimize cost, board space utilization, and enhance performance. As a result, reading either the holding FIFOs 426 and 436 individually or reading them in a ping-pong fashion would result in the data being out of order. To correct this problem, the mass mapping controller 444, which may be configured as a finite state machine, is provided to organize the data. To read the data held in the even accumulator holding FIFO 426, the mass mapping controller 444 reads all the locations of the even accumulator holding FIFO 426, while at the same time sequentially accesses each location of the look-up table memory 442. The value at each location of the look-up table 442 is used as an index or address which indicates where the word just read from the holding FIFO 426 is to be stored in the mass mapped buffer 440. The value at each location of the look-up table 442 is preferably programmed by software running on the ICM 402. This process is repeated when the odd accumulator holding FIFO 436 is read. As a consequence, the data read from the holding FIFOs is organized in the array of memory locations of the mass mapped buffer 440 according to the mass-to-charge (m/z) ratio.

In accordance with the illustration provided above, one example of values that could be used in the look-up table are provided in Table B below:

TABLE B

| LOOK UP TABLE ADDRESS | LOOK UP TABLE VALUE | COMMENTS |
|---|---|---|
| 0 | 0 | Store location 0 of Even Holding FIFO to location 0 of the Mass Mapped Buffer |
| 1 | 2 | Store location 1 of Even Holding FIFO to location 2 of the Mass Mapped Buffer |
| 2 | 4 | Store location 2 of Even Holding FIFO to location 4 of the Mass Mapped Buffer |
| 3 | 6 | Store location 3 of Even Holding FIFO to location 6 of the Mass Mapped Buffer |
| 4 | 9 | Store location 4 of Even Holding FIFO to location 9 of the Mass Mapped Buffer |
| 5 | 11 | Store location 5 of Even Holding FIFO to location 11 of the Mass Mapped Buffer |
| 6 | 13 | Store location 6 of Even Holding FIFO to location 13 of the Mass Mapped Buffer |

TABLE B-continued

| LOOK UP TABLE ADDRESS | LOOK UP TABLE VALUE | COMMENTS |
|---|---|---|
| 7 | 15 | Store location 7 of Even Holding FIFO to location 15 of the Mass Mapped Buffer |
| 8 | 1 | Store location 0 of Odd Holding FIFO to location 1 of the Mass Mapped Buffer |
| 9 | 3 | Store location 1 of Odd Holding FIFO to location 3 of the Mass Mapped Buffer |
| 10 | 5 | Store location 2 of Odd Holding FIFO to location 5 of the Mass Mapped Buffer |
| 11 | 7 | Store location 3 of Odd Holding FIFO to location 7 of the Mass Mapped Buffer |
| 12 | 8 | Store location 4 of Odd Holding FIFO to location 8 of the Mass Mapped Buffer |
| 13 | 10 | Store location 5 of Odd Holding FIFO to location 10 of the Mass Mapped Buffer |
| 14 | 12 | Store location 6 of Odd Holding FIFO to location 12 of the Mass Mapped Buffer |
| 15 | 14 | Store location 7 of Odd Holding FIFO to location 14 of the Mass Mapped Buffer |

According to the above illustrated example, by using the values in look-up table 442 as shown above in Table B, the contents of the mass mapped buffer 440 may be provided as shown in Table C below:

TABLE C

| Time | M/Z | Data Point # | Value | Mass Mapped Buffer Address | Mass Mapped Buffer Data |
|---|---|---|---|---|---|
| $T_1$ | 6 | 0 | 1 | 0 | 1 |
| $T_1$ + 2 nS | 6 | 1 | 2 | 1 | 2 |
| $T_1$ + 4 nS | 6 | 2 | 3 | 2 | 3 |
| $T_1$ + 6 nS | 6 | 3 | 4 | 3 | 4 |
| $T_1$ + 8 nS | 6 | 4 | 3 | 4 | 3 |
| $T_1$ + 10 nS | 6 | 5 | 2 | 5 | 2 |
| $T_1$ + 12 nS | 6 | 6 | 1 | 6 | 1 |
| $T_1$ + 14 nS | 6 | 7 | 1 | 7 | 1 |
| $T_2$ | 8 | 0 | 1 | 8 | 1 |
| $T_2$ + 2 nS | 8 | 1 | 2 | 9 | 2 |
| $T_2$ + 4 nS | 8 | 2 | 3 | 10 | 3 |
| $T_2$ + 6 nS | 8 | 3 | 4 | 11 | 4 |
| $T_2$ + 8 nS | 8 | 4 | 3 | 12 | 3 |
| $T_2$ + 10 nS | 8 | 5 | 2 | 13 | 2 |
| $T_2$ + 12 nS | 8 | 6 | 1 | 14 | 1 |
| $T_2$ + 14 nS | 8 | 7 | 0 | 15 | 0 |

Accordingly, the use of the mass mapped buffer 440 along with the look-up table 442 and mass mapping controller 444 allow for easy organization and storage of the data in the mass mapped buffer 440, without requiring additional software to tag each data word for a particular address. By properly assigning the values in the look-up table 442, the data acquisition system 400 can determine to which digital signal processor to send a set of data points relating to a particular mass for processing therein.

Figure 18:
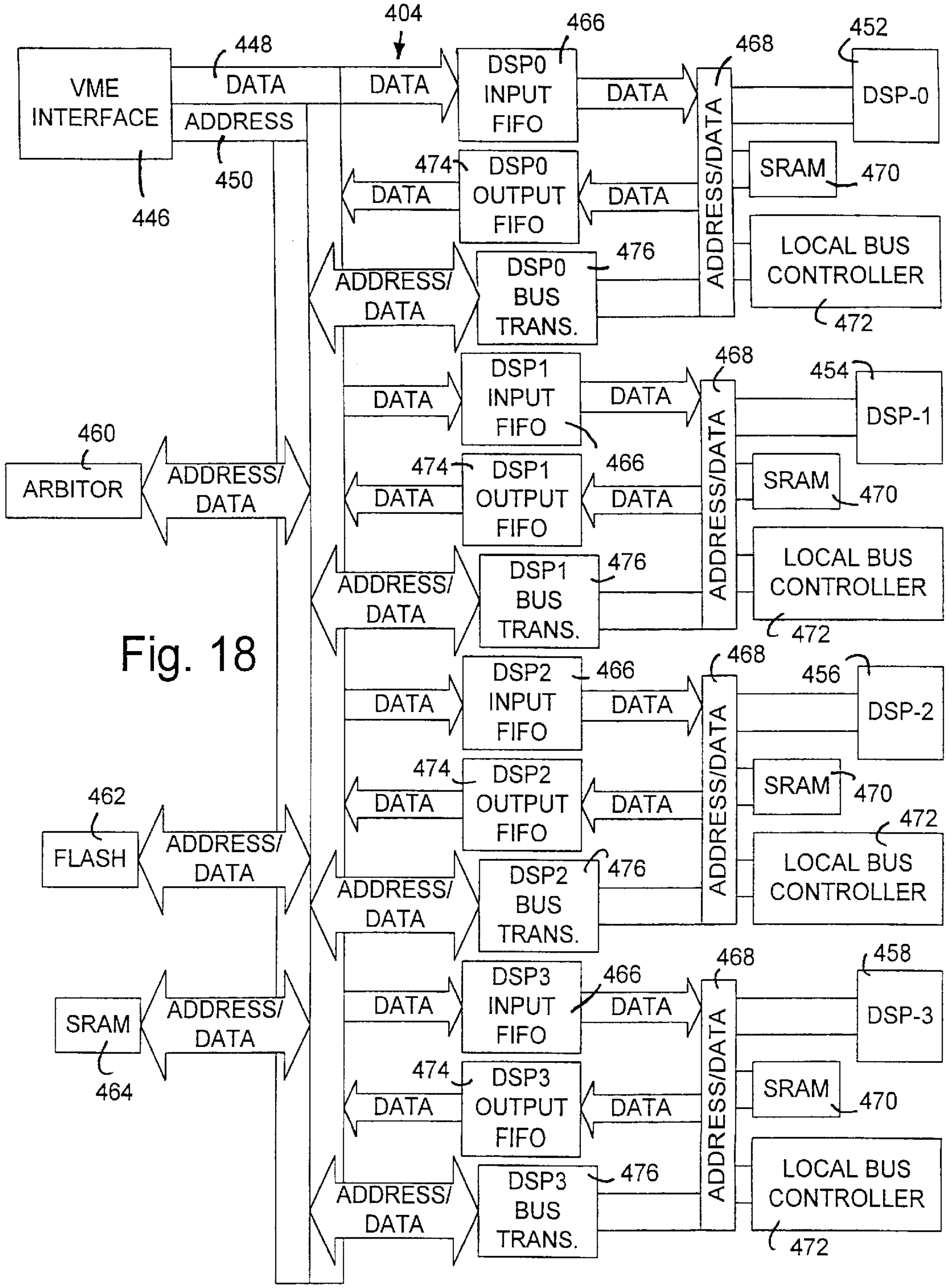
FIG. 18 is a block diagram illustrating the quad digital signal processor (DSP) card architecture as provided in the data acquisition system of FIG. 16.

With particular reference to FIG. 18, the quad digital signal processing (DSP) card 404 is shown containing four digital signal processors DSP-0 452, DSP-1 454, DSP-2 456, and DSP-3 458, all preferably provided on a single card. Each processor is preferably used to process signals for a particular mass. The quad DSP card 404 includes a VME interface 446 for interfacing with the VME bus 13 as well as a data line 448 and an address line 450 for communicating data and address signals, respectively, among the components on quad DSP card 404.

The DSP card 404 further includes an arbitor 460 which can arbitrarily assign a selected number of words to each of the digital signal processors 452, 454, 456, and 458. This is preferably accomplished by way of designated programming software that is associated with and controls the arbitor 460. Arbitor 460 thereby allows selected groups of data words to be transferred to the appropriate digital signal processors for processing therein.

Also included on DSP card 404 is flash memory 462 and SRAM memory 464. The flash memory 462 contains software routines stored therein that are downloaded to each of the digital signal processors 452, 454, 456, and 458. The downloading of these software routines may occur when the system is restarted, such as when the digital processors are rebooted. The SRAM memory 464 may store, among other things, output data processed by the digital signal processors as well as input data.

Associated with each of digital signal processors 452, 454, 456, and 458, is an input FIFO 466 for receiving strings of data from data line 448. The input FIFO 466 receives data corresponding to a particular mass and stores the mass data in the input FIFO 466. The data stored in input FIFO 466 is made available to an address/data line 468 for transmission to the associated digital signal processor that processes data for a designated mass. In addition, each digital signal processor has a private SRAM memory 470 for storing local data for the processor, and each corresponding processor also has a local bus controller 472 that provides access control for the associated processor.

Also associated with each digital signal processor is an output FIFO 474. Output FIFO 474 receives processed data from the corresponding digital signal processor, such as DSP-0 452, and makes the data available on data line 448. The data stored in each of output FIFOs 474 may be transferred to the instrument control unit (ICM-DSP) 402 by way of the VME bus 13. In addition, a bus transceiver 476 is provided for communicating with SRAM memory 464 for such purposes of debugging operations.

In operation, data is transferred to the quad DSP card 404 from the dual accumulator 406 via the VME bus 13. The data transfer is performed by a direct memory access (DMA) controller which resides on the VME bus interface 428 associated with the dual accumulator 406. The data held on the dual accumulator 406 and the addressing of the input FIFOs 466 associated with each of the digital signal processors 452, 454, 456, and 458 on the quad DSP card 404 are organized to allow the data transfer to occur such that the DMA controller only needs to be setup once per data transfer. This minimizes the software overhead of transferring data for the dual accumulator 406 to the quad DSP card 404. The ability to store and transfer the data in this manner is accomplished by the mass mapping buffer 440 along with controller 444 and look-up table 442, as well as the ability to program the address used for the input FIFOs 466 on the quad DSP card 404. The ICM-DSP 402 software sets up the addresses for the input FIFOs 466 to match the organization of the data in the mass mapped buffer 440.

Once the data has been transferred to the input FIFOs 466 associated with each digital signal processor on the quad DSP card 404, the software running the four processors 452, 454, 456, and 458 will begin processing, preferably in parallel. The software associated with each processor 452, 454, 456, and 458 is responsible for first finding the peak for each mass, determining what the gain setting will be, and then writing the gain value to a table in the SRAM memory 464. The table in SRAM memory 464 is written therein whether or not the gain setting for a given mass needs to be changed. When all four processors 452, 454, 456, and 458 have completed the gain calculations, then the new gain table will be transferred to the A/D convertor and ion counter board 410. This is preferably accomplished by a DMA controller on the quad DSP board 404.

Depending upon the mode in which the mass spectrometer is operating, one of the following three steps will be performed. According to one possible step, the ion counting data and analog data is summed and then sent to the ICM-DSP 402. The rate at which this data is sent to the ICM-DSP 402 is selectable, and may be in the range of 50 to 200 Hz, for example. Alternately, according to a second possible step, a determination is made as to whether to use ion counting data or analog data. If the analog data is used, the analog data is summed with the analog data collected thus far. If the counting data is used, the counting data is summed with the counting data collected thus far. The summed data is then sent to the ICM-DSP 402 at a selectable rate, for example, in the range of 50 to 200 Hz. Alternately, according to a third possible step, a determination is made as to whether to use ion counting data or analog data. For each mass, one data point is produced by summing all of the individual data points associated with that mass using either the analog data or the counting data. This value will then be added to the previously summed data for that mass. This will reduce each mass to a single value which will result in a data compression of approximately 10:1. These data values are then sent to the ICM-DSP 402 at a selectable rate, for example in the range of 50 to 200 Hz.

Once each digital signal processor has completed processing the data for a particular mass and is ready to send the data to the ICM-DSP 402, the ICM-DSP 402 is signalled and a DMA controller on the ICM-DSP 402 transfers the data from the output FIFOs 474 on the quad DSP card 404. The address decoding for the output FIFOs 474 is programmable such that the software on the ICM-DSP 402 only is required to setup the DMA controller once.

Figure 19:
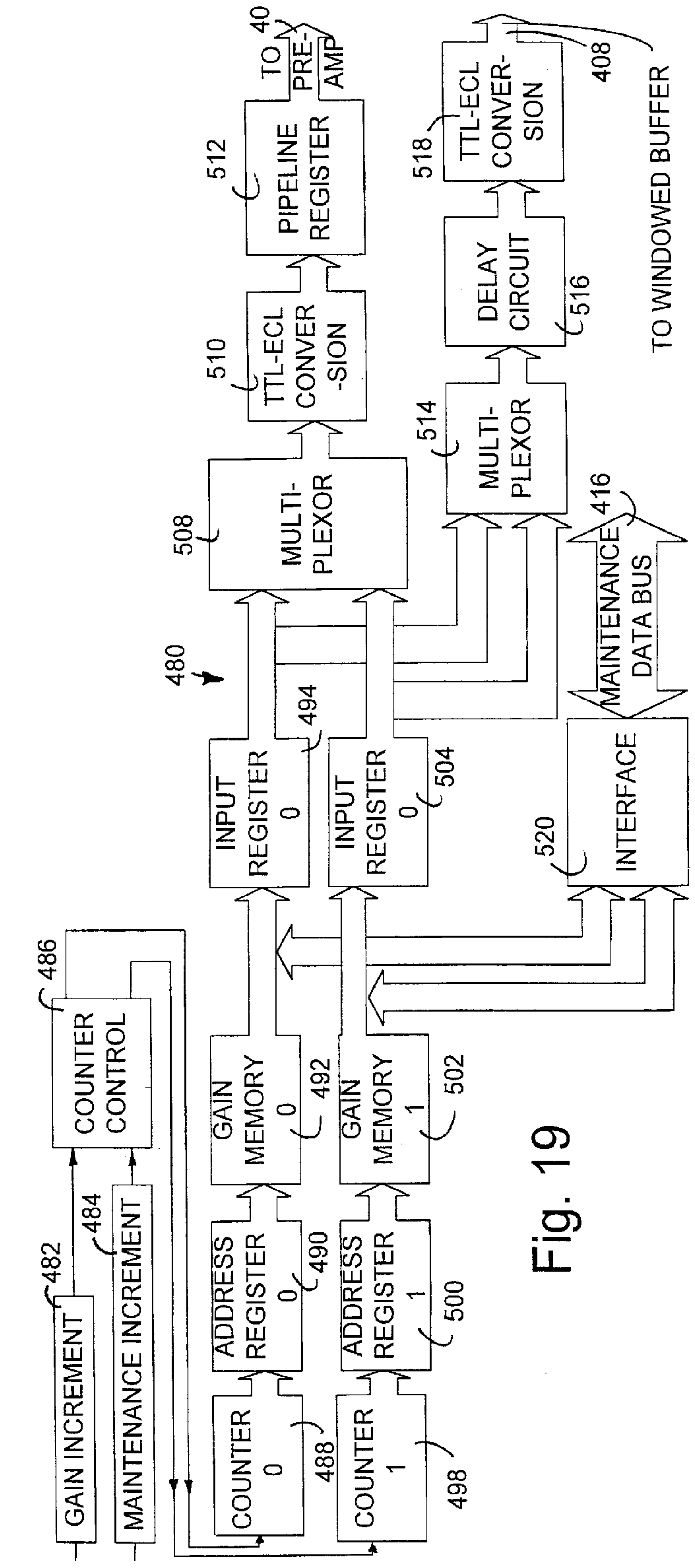
FIG. 19 is a block diagram illustrating an amplifier gain control circuit for use in the data acquisition system according to an alternate embodiment of the present invention.

Referring to FIG. 19, an amplifier gain memory control circuit 480 is illustrated for use in the data acquisition system, according to another embodiment of the present invention. The gain memory control circuit 480 is employed to set the gain of the pre-amplifier 40 for each specific mass-to-charge ratio in the time-of-flight spectrum in a manner that allows gain memory to be updated without interrupting the data collection. In addition, the gain setting is accomplished to provide a broad dynamic range while still maintaining a high signal-to-noise ratio and a high sample rate.

The gain memory control circuit 480 includes two separate banks of gain memory, namely, gain memory 492 and gain memory 502. This enables one bank of gain memory to act as an idle memory bank in which new gain settings can be written into, while the data acquisition system continues to collect and sum spectra using the current gain settings in the other bank of gain memory. Associated with the first bank of gain memory 492 is a counter 488 and an address register 490 for selecting the address of the current gain setting stored in gain memory 492. An input register 494 holds the gain value stored in the addressed memory location of gain memory 492. Likewise, the second bank of gain memory 502 has a counter 498 and an address register 500 associated therewith for addressing the location of the current gain value of gain memory 502. An input register 504 holds the gain value stored in the address memory location of gain memory 502.

The gain memory control circuit 480 also includes a counter control 486 which may include 32 to 128 programmable gain settings, for example. Counter control 486 receives a gain increment signal 482 as well as a maintenance increment signal 484. Gain increment signal 482 is determined from software held in memory in the A/D and in ion counter card 410. In effect, gain increment signal 482 causes counter control 486 to actuate a counter increment which, in turn, increments one of counters 488 or 498. This, in turn, changes the addressed memory location in the corresponding banks of gain memory so as to change the gain setting. The current gain settings addressed in each bank of gain memory 492 and 502 are held in corresponding input registers 492 and 504, respectively.

The maintenance increment signal 484 is used to initiate memory updates of the first and second banks of gain memory 492 and 502. The actual downloading of new gain settings is accomplished by way of interface 520 and maintenance data bus 416. In effect, responsive to the maintenance increment signal 484, maintenance data bus 416 and interface 520 write to one of the first or second banks of gain memory that is idle to reconfigure the gain settings as desired, as well as to provide diagnostic testing capability.

The gain values stored in input registers 494 and 504 are 4-bit codes that are made available in parallel to the pre-amplifier 40 as well as the windowed buffer 408. Associated with the pre-amplifier gain control line is multiplexer 508 which switches between input registers 494 and 504 to read the stored gain values. A transistor-transistor logic-emitter-coupled logic (TTL-ECL) convertor 510 converts the gain value held in multiplexer 508 from a TTL voltage level to an ECL voltage level, which may be utilized by the pre-amplifier. In addition, a pipelined register 512 holds the converted 4-bit gain code which is then communicated to the pre-amplifier 40 to control the current gain setting.

At the same time, the gain values held in input registers 494 and 504 are communicated in parallel to pipelined registers 496 and 506, respectively. A multiplexer 514 switches between pipelined registers 496 and 506 to receive the gain values held therein. A delay circuit 516 delays the transmission of the gain settings to the windowed buffer so that the gain settings arrive simultaneously with the gain compensated data output from pre-amplifier 40 and its associated A/D convertor. The delay compensates for the delay which, in effect, occurs particularly with the A/D convertor as well as any other delay associated with the pre-amplifier 40. A transistor-transistor logic-emitter-coupled logic (TTL-ECL) convertor 518 likewise converts the gain value output from delay circuit 516 from a TTL voltage level to an ECL voltage level which is communicated to the windowed buffer 408. Accordingly, the pre-amplifier 40 receives a current gain setting and adjusts the voltage level of the data as necessary to maintain a preferred range, while the windowed buffer simultaneously receives the same gain setting such that the data acquisition system can compensate for the gain adjusted data.

The data acquisition system is configured to collect data at certain times in each mass spectrum. The certain times correspond to the mass-to-charge ratio of interest, and data is collected preferably at these times only. Software is used to control the data acquisition to configure the gain control memory and gain memory accordingly. Each mass-to-charge ratio of interest has the ability to have a unique gain setting as long as the time between adjacent mass-to-charge ratios is greater than the settling time of the pre-amplifier. When the data acquisition system begins collecting data, the gain setting for each mass-to-charge ratio is set to the maximum level. When the data acquisition system has completed summing a set of spectra using the dual accumulator, then the summed spectra is analyzed to determine if the gain setting is appropriate for each mass-to-charge ratio. If the gain needs to be decreased for any mass-to-charge ratio, then the new gain settings are written into the idle bank of gain memory. While this is being accomplished, the data acquisition system continues to collect and sum spectra using the current gain settings provided in the active bank of gain memory. When the new gain settings are in place, the gain control logic for the gain memory will then switch over to the new gain setting. This switch preferably takes place at the end of the spectrum to maintain the integrity of the summed spectra. The process of summing, analyzing, and updating gain settings continues as long as the data acquisition system is collecting data and preferably takes place without any loss or corruption of data. Also, it is preferred that the rate of change of the signal intensity in any one mass-to-charge ratio be less than that of the gain memory update rate.

The operation of the gain memory control circuit 480 is provided as follows. With the gain memory divided into two separate banks 492 and 502, one bank of gain memory is always active or in use, while the other remains idle. The active bank of gain memory is used to supply gain settings to the pre-amplifier 40, while the idle bank of gain memory may be updated with the new gain settings. Prior to collecting data, the software preferably sets up a memory called the gain control memory (not shown) that is responsible for generating the gain increment signal 482 to the control counter 486. The gain increment signal 482, in effect, controls the point in time when a new gain setting becomes active. Each pulse in the gain increment signal causes an increment of either counter 488 or counter 498, depending upon which bank of gain memory is idle.

The following example assumes that the bank of gain memory 492 is active and the other bank of gain memory 502 is idle. When a pulse occurs on the gain increment signal 482, the following events occur: the pipeline registers 496 and 512 are loaded with the gain setting found in input register 494. The output of pipeline register 496 is sent to the windowed buffer board so that the digitized data can be justified appropriately and the output of pipeline register 512 is sent to the pre-amplifier 40; input register 494 is loaded with the gain setting from the current memory location found in gain memory 492. Address register 490 is loaded with current value provided in counter 488, and counter 488 (N) is incremented to the next value (N+1).

The entire gain control circuit 480 is preferably pipelined to minimize the effects of propagation delays. To update the idle bank of memory, the maintenance increment signal 484 is used to advance counter 498, and the interface 520 communicates with maintenance data bus 416 to supply new data to gain memory 502 or to read the data in gain memory 502. Accordingly, the gain memory control circuit 480 allows for changes to be made to the amplifier gain setting without experiencing loss of data or otherwise corrupting data.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A data acquisition system for detecting ions of interest in a time-of-flight mass spectrometer, said system comprising:

a signal acquisition circuit for detecting ions and generating output signals indicative of detected ions;

a storage control circuit for marking said output signals to be stored;

a mass mapped buffer for storing said signals to be stored according to the mass-to-charge ratio;

a look-up table for addressing locations of said signals stored in said mass mapped buffer;

a controller for controlling said mass mapped buffer and said look-up table and arranging said signals to be stored in said mass mapped buffer; and a digital signal processor receiving said signals to be stored in said buffer for processing, and generating an output indicative of certain ions of interest.

2. The system as defined in claim 1, further comprising an accumulator circuit for holding said signals to be stored.

3. The system as defined in claim 2, wherein said accumulator circuit comprises a first accumulator circuit and a second accumulator circuit, said first and second accumulator circuits collecting data in an interleaved fashion.

4. The system as defined in claim 1, wherein said storage control circuit further marks said output signals to be stored and signals to be ignored.

5. The system as defined in claim 1, further comprising an amplifier for amplifying said signals to be stored, said amplifier including an adjustable gain setting.

6. The system as defined in claim 5, further comprising:

a first bank of gain memory containing a first plurality of selectable gain settings;

a second bank of gain memory containing a second plurality of gain settings; and a gain control circuit for selecting a gain setting from one of said first and second banks of gain memory at a time, wherein one of said banks of gain memory is actively supplying a gain setting output, while the other of said banks of gain memory may be updated with a new gain setting.

7. The system as defined in claim 6, wherein said gain control circuit further comprises a counter and address register associated with each of said first and second banks of gain memory, said counter being incremented to select an address of said corresponding bank of gain memory so as to select said updated new gain setting.

8. A data acquisition system for detecting ions of interest in a mass spectrometer, said system comprising:

a signal acquisition circuit for detecting ions and generating output signals indicative of detected ions;

a storage control circuit for marking said output signals to be stored;

an amplifier for amplifying said signals to be stored;

a first bank of gain memory for storing a first set of gain settings;

a second bank of gain memory for storing a second set of gain settings;

a gain control circuit for selecting one of said gain settings from one of said first and second banks of gain memory, one of said first and second banks of gain memory being active to provide a current gain setting, while the other of said first and second memory banks is idle to allow for updating of the selected gain setting; and a digital signal processor circuit receiving said signals to be stored for processing, and generating an output indicative of certain ions of interest.

9. The system as defied in claim 8, wherein said storage control circuit further marks said output signals to be stored and signals to be ignored.

10. The system as defined in claim 8, further comprising:

an accumulator circuit for holding said signals to be stored;

a mass mapped buffer for storing said signals to be stored according to mass-to-charge ratio;

a look-up table for addressing locations of said signals stored in said mass mapped buffer; and a controller for controlling said mass mapped buffer and said look-up table and arranging said signals to be stored in said mass mapped buffer.

11. The system as defined in claim 10, wherein said accumulator circuit comprises a first accumulator circuit and a second accumulator circuit, said first and second accumulator circuits collecting data in an interleaved fashion.

12. The system as defined in claim 8, wherein each of said gain settings of said first and second sets of gain settings corresponds to a selected mass-to-charge ratio of interest.

13. A method for detecting ions of interest in a time-of-flight mass spectrometer, said method comprising the steps of:

detecting ions with a signal acquisition circuit and generating output signals indicative of detected ions;

marking said output signals to be stored;

holding said signals to be stored;

storing in a mass mapped buffer said signals to be stored according to mass-to-charge ratio;

addressing locations of said signals stored in said mass mapped buffer with a look-up table; and processing said stored signals in said buffer and generating an output indicative of certain ions of interest.

14. The method as defined in claim 13, further comprising the step of marking said output signals to be stored and signals to be ignored.

15. The method as defined in claim 13, wherein said step of holding said signals to be stored further comprises storing said signals in first and second accumulator circuits in an interleaved fashion.

16. The method as defined in claim 13, further comprising amplifying said signals to be stored with an amplifier having an adjustable gain setting.

17. The method as defined in claim 16, further comprising the step of selecting a gain setting from one of first and second banks of gain memory at a time, wherein said one of said banks of gain memory is actively supplying a gain setting output, while the other of said banks of gain memory may be updated with a new gain setting.

18. The method as defined in claim 17, wherein said step of updating a new gain setting further comprises incrementing a counter to select an address from one of said banks of gain memory so as to select said updated new gain setting.

19. A method for detecting ions of interest in a mass spectrometer, said method comprising the steps of:

detecting ions with a signal acquisition circuit and generating output signals indicative of detected ions;

marking said output signals to be stored;

amplifying said signals to be stored with an amplifier having an adjustable gain setting;

storing a first set of gain settings in a first bank of gain memory;

storing a second set of gain settings in a second bank of gain memory;

selecting one of said gain settings from said one of said first and second banks of gain memory, one of said first and second banks of gain memory being active to provide a current gain setting, while the other of said first and second banks of gain memory is idle to allow for updating of the adjustable gain setting; and processing said signals to be stored and generating an output indicative of certain ions of interest.

20. The method as defined in claim 19, further comprising marking said output signals to be stored and signals to be ignored.

21. The method as defined in claim 19, further comprising the steps of:

holding said signals to be stored in a first accumulator circuit and a second accumulator circuit, said first and second accumulator circuits collecting data in an interleaved fashion;

storing said signals to be stored in a mass mapped buffer according to mass-to-charge ratio; and addressing the locations of said signals stored in said mass mapped buffer.

22. The method as defined in claim 19, wherein each of said gain settings of said first and second sets of gain settings corresponds to a selected mass-to-charge ratio of interest.

* * * * *